United States Patent
Abdul Hameed Khan

(10) Patent No.: US 10,182,049 B2
(45) Date of Patent: Jan. 15, 2019

(54) SYSTEM AND METHOD OF GENERATING AND USING BILATERALLY GENERATED VARIABLE INSTANT PASSWORDS

(71) Applicant: Abdul Rahman Syed Ebrahim Abdul Hameed Khan, Chennai (IN)

(72) Inventor: Abdul Rahman Syed Ebrahim Abdul Hameed Khan, Chennai (IN)

(*) Notice: Subject to any disclaimer, the term of this patent is extended or adjusted under 35 U.S.C. 154(b) by 0 days.

(21) Appl. No.: 15/713,621

(22) Filed: Sep. 23, 2017

(65) Prior Publication Data

US 2018/0013756 A1 Jan. 11, 2018

Related U.S. Application Data

(62) Division of application No. 14/738,715, filed on Jun. 12, 2015, now Pat. No. 9,813,415.

(51) Int. Cl.

| G06F 21/00 | (2013.01) |
|---|---|
| H04L 29/06 | (2006.01) |
| H04W 12/06 | (2009.01) |
| H04W 12/08 | (2009.01) |
| H04L 29/08 | (2006.01) |

(52) U.S. Cl.
CPC ........ *H04L 63/0838* (2013.01); *H04L 63/083* (2013.01); *H04L 63/105* (2013.01); *H04L 67/14* (2013.01); *H04L 67/20* (2013.01); *H04W 12/06* (2013.01); *H04W 12/08* (2013.01)

(58) Field of Classification Search
CPC ..... H04L 63/0838; H04L 67/20; H04L 67/14; H04L 63/083; H04L 63/105; H04W 12/08; H04W 12/06
See application file for complete search history.

(56) References Cited

U.S. PATENT DOCUMENTS

| 6,772,336 | B1* | 8/2004 | Dixon, Jr. | G06F 21/31 713/165 |
|---|---|---|---|---|
| 7,526,762 | B1* | 4/2009 | Astala | G06F 8/33 709/203 |
| 8,625,761 | B2* | 1/2014 | Fujii | G06F 21/313 379/142.05 |
| 9,521,127 | B1* | 12/2016 | Childress | H04L 63/06 |
| 9,536,069 | B1* | 1/2017 | Shah | G06F 21/31 |

(Continued)

*Primary Examiner* — Lisa C Lewis
(74) *Attorney, Agent, or Firm* — Law Ofc of Heena N. Kampani; Heena N. Kampani

(57) ABSTRACT

Implementations of a system and method of generating and using bilaterally generated variable instant passwords are disclosed. In some implementations, a computer implemented method of Authenticated Dialogue Initiation between a USER and another party is provided. In some implementations, the USER may attempt to establish a connection with another party at their IP address; the other party may be known or unknown by the USER. In this implementation, a publically available authentication device, comprised of a variable character set, is used to generate a CALL for a password. The password is used to authenticate the other party; authentication is to completed once the correct password is received from the IP address of the party contacted by the USER. In some implementations, Authenticated Dialogue Initiation may be used to control (e.g., grant, deny, and/or limit) another party's access to the USER's computer system.

6 Claims, 5 Drawing Sheets

(56) References Cited

U.S. PATENT DOCUMENTS

| | | | |
|---|---|---|---|
| 2002/0150253 A1* | 10/2002 | Brezak | H04L 63/0428 380/281 |
| 2006/0136740 A1* | 6/2006 | Smith | G06F 21/31 713/184 |
| 2006/0156385 A1* | 7/2006 | Chiviendacz | G06F 21/36 726/2 |
| 2007/0005967 A1* | 1/2007 | Mister | G06F 21/36 713/168 |
| 2007/0028088 A1* | 2/2007 | Bayrak | H04L 63/0428 713/150 |
| 2008/0195976 A1* | 8/2008 | Cho | G06F 3/0233 715/840 |
| 2009/0037986 A1* | 2/2009 | Baker | G06F 21/31 726/5 |
| 2009/0313694 A1* | 12/2009 | Mates | G06F 21/36 726/21 |
| 2010/0031330 A1* | 2/2010 | Von Ahn | G06F 21/36 726/5 |
| 2010/0293376 A1* | 11/2010 | Colon | H04L 9/0844 713/168 |
| 2011/0030040 A1* | 2/2011 | Ronchi | G06F 21/126 726/5 |
| 2012/0272311 A1* | 10/2012 | Althammer | G06F 21/36 726/16 |
| 2013/0073853 A1* | 3/2013 | Ford | H04L 63/1466 713/168 |
| 2013/0080242 A1* | 3/2013 | Alhadeff | G06Q 30/0239 705/14.39 |
| 2013/0283358 A1* | 10/2013 | Manroa | H04W 12/08 726/5 |
| 2015/0242597 A1* | 8/2015 | Danciu | G06F 21/10 726/30 |
| 2016/0337386 A1* | 11/2016 | Ford | H04L 63/1416 |
| 2017/0063821 A1* | 3/2017 | Chen | H04L 63/08 |
| 2017/0124312 A1* | 5/2017 | Inoue | G06F 21/32 |

* cited by examiner

FIGURE 4

VCS 5

|    | 0   | 1  | 2  | 3  | 4  | 5  | 6  | 7  | 8  | 9  |
|----|-----|----|----|----|----|----|----|----|----|----|
| 1  | pF  | IO | Bu | Im | mZ | cI | KΘ | Fm | $c | aω |
| 2  | 1D  | fg | Vr | sN | OU | zP | θA | 2u | aO | AC |
| 3  | $h  | yy | IZ | 96 | rA | Sr | θΓ | II | OU | LC |
| 4  | za  | 2r | Em | Ov | NV | r@ | εΦ | $q | It | 1x |
| 5  | Xn  | DP | Kn | Hy | pn | cE | OK | OS | CI | 1p |
| 6  | Jf  | QN | Iz | 3P | KG | 2j | QO | 7s | pK | b1 |
| 7  | bw  | 6Y | Im | vW | GW | qX | wW | vn | OG | V9 |
| 8  | co  | ce | tM | ok | a1 | DX | KM | zL | g0 | Tm |
| 9  | Gd  | zS | wl | 1u | $E | La | zF | Ul | gl | Pl |
| 10 | Y5  | ze | aY | CU | b1 | tM | @x | Qa | I1 | dj |

64 characters: (A to Z, a to z, 0 to 9, @, $);

10 font sizes: (10, 12, 14, 16, 18, 20, 22, 24, 26, 28);

20 colors: (Black, Grey 50%, Red, Rose, Pink, Tan, Dark Red, Turquoise, Lime, Sky blue, Green, Aqua, Dark Teal, Plum, Blue, Blue Grey, Violet, Orange, Lavender, Dark Green);

20 font types: (Arial, Arial Black, Arial for Oup 97, Arial Narrow, Book Antiqua, Bookman Old Style, Century Gothic, Georgia, City Blueprint, Comic Sans MS, Country Blueprint, Courier, Courier New, Euro Roman, Garamond, Haettenschweiler, Impact, Lucida Console, Monotype Corsiva, MS Sans Serif, MS Serif); and With Underlined or non-Underlined characters.

FIGURE 5

VCS 6

| | 1 | 2 | 3 | 4 | 5 | 6 | 7 | 8 | 9 | 10 |
|---|---|---|---|---|---|---|---|---|---|---|
| 0 | βc | ﺣﻲ | دس | °q | ﺋﺚ | s♪ | ω☼ | w¹ | εس | πج |
| 1 | ♥♫ | ☆† | 🚗Y | °V | j° | rᶓ | ωa | ♀y | dG | ﺵ♀ |
| 2 | ♂s | 43 | ηA | ⁷O | Tε | K☆ | ♪φ | δA | 🚌ω | πω |
| 3 | m² | A° | Z° | 9¹ | ⸺B | ΛB | ⸺ | ﺷ | ﺕ | ⸺ |
| 4 | ⸺ᴧ | QB | hs | yε | 9v | ﻆa | n⸺ | ♠$ | 6C | βh |
| 5 | ⸺ᴧ | 2f | ♀b | †👁 | $j | ﻂR | ♣ | 9⸺ | ⸺ | ﺙ³ |
| 6 | λm | ⸺ | ᵤ$ | ʌf | ⸺♥ | C¹ | ε⸺ | ⸺w | ⸺Γ | B⸺ |
| 7 | x | ♠p | π⁹ | ξM | †¹ | Bh | @A | αﺕ | H♂ | θξ |
| 8 | ﺙω | X⸺ | B⸺ | Yκ | ﺥω | ♣ | $η | ﻃa | O⸺ | @U |
| 9 | ﻂa | c⸺ | ﻂᴧ | πΓ | ow | ﺱﺥ | h⁹ | Ep | ﺝJ | dw |
| 10 | λv | ⸺Q | 3⸺ | AC | ♥ﺥ | B | ⸺Θ | CZ | M¹ | 6L |
| 11 | hλ | ψ | ωM | 2α | fΓ | ⸺ | ▲ﻆ | H° | ﺵ | 4x |
| 12 | X | Vα | sR | ♥η | Π7g | ♂ | aP | 71 | Qξ | R$ |
| 13 | ⸺ | @V | ⁷† | ηﺱ | θ◉ | Bﺙ | ⸺A | @ε | h² | ♀6 |
| 14 | ✳E | ⸺ | 3⸺ | 5♫ | ⸺ﺫ | ﺙ⸺ | cR | ≤4 | Vő | e▶ |

125 characters from 3 languages, symbols and pictures: English: A to Z, a to z, 0 to 9, @, $, Greek: α, β, γ, δ, ε, ζ, η, θ, λ, μ, ξ, π, ψ, ω, χ, Arabic: ﺏ, ﺕ, ﺙ, ﺝ, ﺥ, ﺩ, ﺫ, ﻂ, ﻇ, ﺱ, ﺵ, ١, ٢, ٣, ٤, ٥, ٦, ٧, V, ᴧ, ٩, others: ♫, A, B, X, E, ✳, ❀, ♀, ⸺, 🚌, 🚗, ♂, †, ⸺, ☆, ☼, ♠, ♣, ♥, ♦, □, ▶, ♀, ♂, ♪;

Font Sizes: 10, 12, 14, 16, 18, 20, 22, 24, 26, 28;

20 Colors: Black, Red, Pink, Dark Red, Lime, Green, Dark Teal, Blue, Violet, Lavender, Grey 50%, Rose, Tan, Turquoise, Aqua, Sky blue, Plum, Blue Grey, Orange, Dark Green;

With Underlined or non-Underlined characters; and 20 font types: Arial, Arial Black, Arial for Oup 97, Arial Narrow, Book Antiqua, Bookman Old Style, Century Gothic, City Blueprint, Comic Sans MS, Country Blueprint, Courier, Courier New, Euro Roman, Garamond, Haettenschweiler, Impact, Lucida Console, Monotype Corsiva, Times New Roman, and Technic for English characters.

SYSTEM AND METHOD OF GENERATING AND USING BILATERALLY GENERATED VARIABLE INSTANT PASSWORDS

CROSS REFERENCE TO RELATED APPLICATION

This application is a divisional application of U.S. patent application Ser. No. 14/738,715, which was filed on Jun. 12, 2015, and is incorporated herein by reference in its entirety.

TECHNICAL FIELD

This disclosure relates to implementations of a system and method of generating and using bilaterally generated variable instant passwords.

BACKGROUND

Prior art authentication systems frequently rely on passwords as a way of verifying a user's identity. In general, these password authentication systems rely on Static passwords or Dynamic passwords. In some instances, Biometrics authentication is used in-lieu of a password system.

Static passwords are predefined alpha-numeric sequences that are selected prior to the initiation of an authentication event or transaction. Static passwords by their very nature do not change between transactions which results in well known security deficiencies. However, in spite of these known security deficiencies, Static password authentication systems are widely used because there are readily available, cost effective alternatives.

Dynamic password systems sometimes referred to as one-time password systems are known to those of ordinary skill in the art. Dynamic password systems are characterized by the password used to authenticate transactions being changed regularly and not remaining constant.

However, Dynamic password systems have several known deficiencies. First, a separate encryption system may be required to secure one or more transactions after authentication. Second, memorization is often required to use prior art authentication devices/systems which often rely on algorithms and/or pattern forming methods to generate a dynamic password. Pins, algorithms, and procedure memorization are often required for the user to properly generate and enter the appropriate Dynamic password. The complexity of some algorithms and procedures may make it difficult for users to use such password authentication systems. Third, Dynamic password systems require that the user and the authentication system are synchronized. As a result, it is not possible for the user to enter the correct Dynamic password if synchronization between the user and the authentication system is lost. Fourth, calculations required to validate the Dynamic password during authentication are computationally intensive. Further, the rejection of incorrectly entered passwords is particularly computationally intensive. Fifth, any hardware device used as part of the authentication system will require a power source (e.g., a battery), an initialization time, and a resynchronization time. Sixth, the authentication system may be provided by a third party (e.g., a third party provided authentication server) thereby further increasing the cost of using a Dynamic password authentication system. Seventh, authentication devices used as part of a Dynamic password authentication system may require graphical user interfaces and the provision of individual authentication devices to each user thereby driving up the cost associated with the deployment of such systems. Eighth, in instances where a pre-printed list of one-time passwords is used, the user and service provider between which a transaction is taking place must keep track of the order in which to use a particular password. This is a cumbersome method which requires frequent replacement of the pre-printed list.

Some Dynamic password systems rely on Random Partial Pattern Recognition principles. These authentication systems use an authentication device having a graphical user interface that relies on a user using patterns to identify the correct alpha-numeric units, listed in an ordered set of data fields, of the password. Such authentication systems may not be readily adaptable for use with devices (e.g., cameras, mobile devices, etc . . . ) that do not have a graphical user interface. Also, these authentication systems may require the use of a third party system to secure a transaction.

Biometric authentication relies on human characteristics as a form of identification. While biometrics characteristics may be completely unique to each person they fail to offer as many unique combinations as are available through the use of an eight-character password. Further, a separate system may be required to secure transactions following authentication of the user. Biometric authentication systems are expensive and require specialized software and hardware for their use. Biometric identifier data is frequently generated from unique characteristics of the user which are not easily changed (e.g., finger prints). If the biometric identifier data is stolen the user may never again be able to securely use the stolen biometric identifier data.

In general, the prior art authentication systems routinely rely on a separate or third party encryption systems to secure the transaction after authentication has taken place. These prior art authentication systems fail to provide a system or method of ongoing authentication of the user, the service provider and/or the individual objects (e.g., a single email, data packet, file, etc . . . ) being exchanged during a session that relies on the use of a plurality of passwords. Further, many of the prior art authentication systems operate on the premise that once authenticated access has been achieved further authentication (or re-authentication) is not required to authenticate actions (e.g., the exchange of objects) taken by the user on a service providers system. In this way, these prior art authentication systems may be unable to prevent unauthorized access by third parties.

OBJECTS AND ADVANTAGES OF THE INVENTION

The present invention aims to provide a simple, versatile, user friendly, economical, highly secure, variable, flexible, multifunctional password encryption key system.

The present invention provides for a self reliant Password system to generate encryption keys to secure Internet/network transactions. The Password system itself may provide two computationally non-intensive encryption keys. These encryption keys may be variable. In some implementations, the encryptions keys may be linked to the identity of the user. In some implementations, the encryption keys may be used for authentication of the user and to secure Internet and other network transactions. In some implementations, the encryption keys may be used to authenticate and secure every transaction between a user and a service provider's system. In some implementations, the encryption keys may be used to authenticate and secure objects (e.g., a single email, data packet, file, etc . . . ) exchanged between a user and a service provider's system.

The Password system may be used by both human users and user devices (e.g., a camera and/or mobile devices) to generate a password. A password may be generated without the user having to provide a memorized pin, pattern, or other special procedure.

In some implementations, the Password system may provide for the generation of a variable password each time a user object seeks access to a service providers system (e.g., network system, website, etc . . . ). In some implementations, the variable password may be used to designate the portions of the service providers system which may be accessed by the user. In some implementations, ongoing authentication may be required of the user by the service provider. In this way, a new variable password is provided by the user to authenticate their identity at time intervals, or in response to other triggers (e.g., number of transactions), specified by the service provider.

In some implementations, the Password system may require the use of a variable password for every transaction. The transaction may be limited to a single action of the user and the subsequent response from the service provider. In some implementations, different password(s) may be required for the user to gain access to different portions of a service providers system.

In some implementations, the verification mechanism used to authenticate a password generated by the Password system is integrated or resides within a service providers system. In this way, separate or third party systems are not required to secure a service providers system.

In some implementations, the Password system may be configured to generate additional passwords using the initial password inputted into the system by the user at the beginning of a session (e.g., accessing a service providers system). These additional passwords may be traceable back to the initial password inputted and thereby the user, transaction, and session. In this way, a human user may not be burdened with furnishing individual variable passwords for every transaction or access of a service providers system.

In some implementations, a temporary authentication device may be used to generate a password that is traceable to a new user, users who were previously unknown to the service provider, and individual sessions and transactions. In this way, the service provider may identify a new user/previously unknown user and authenticate each individual action and object exchanged between the new user/previously unknown user and the service providers system.

In some implementations, the Password system provides for a simple, computationally non-intensive password system adoptable and usable by all human users. In some implementations, the Password system may be implemented into non computer systems like mobile phones, digital camera, or similar devices.

In some implementations, a Call initiation method may be used to authenticate and/or regulate user access to a service provider's system. In some implementations, the Call initiation or a dialogue initiation may be used to regulate a previously unknown third party seeking access to a protected system.

In some implementations, the Password system provides an easy means by which users may be classified upon access to a service providers system. In this way, the user's access to sub-domains (e.g., designated portions of the service providers system which may be accessed by the user) is controlled.

In some implementations, the Password System may provide a level of security equal to or higher than what is available in prior art password systems. In some implementations, the security level is not predetermined by the Password system but set by the service provider.

SUMMARY OF THE INVENTION

The first embodiment of the Bilaterally Generated Variable Instant Password System invention integrates several security functions, including, Call initiation, user Classification, Symmetric encryption key system, and User authentication. In some implementations, the Bilaterally Generated Variable Instant Password System may use two different computationally non-intensive encryption keys to secure and authenticate Internet and other network transactions between a user (existing users and new users) and a service provider. In some implementations, the encryption keys may be linked to a user's identity.

The second embodiment of the invention is directed to a Bilaterally Generated Variable Instant Password System that relies on an authentication device using a Variable Character Set system. In some implementations, the Variable Character Set system may include a Variable Character Set, Master Variable Character Set, Sub Variable Character Set, and a Sub Variable Character Set of level 2 or more (e.g., level 3, 4, etc . . . ). A method of generating and using the Master Variable Character Set, Sub Variable Character Set, and a Sub Variable Character Set of level 2 or more is provided.

The third embodiment of the invention is directed to a method of creating a Password that uses font and/or other distinguishing properties to differentiate two or more passwords that rely on the same characters. In this way, authentication devices that rely on password characters differentiated by font or other distinguishing properties provide for higher variability and flexibility of the password.

The fourth embodiment of the invention is directed to the transformation of the second embodiment to obtain a higher level of security.

The fifth embodiment of the invention is directed to an authentication process of the Bilaterally Generated Variable Instant Password System.

The sixth embodiment of the invention is directed to the generation of a Bilaterally Generated Variable Instant Passwords.

The seventh embodiment of the invention is directed to the generation of a Non Repeating Bilaterally Generated Variable Instant Passwords.

The eighth embodiment of the invention is directed to a method of authentication for each object (e.g., a single email, data packet, file, etc . . . ) exchanged between a User and a Service Provider's System. In some implementations, every Internet or other network transaction between a user and a service provider's system may be authenticated. In some implementations, the method of authentication includes the use of a Call and a Password, each of which acts as an encryption key for a particular transaction.

The ninth embodiment of the invention is directed to a method of authenticating and securing every Internet or other network transaction between a user and a service provider's system. In some implementations, authentication may include the use of different passwords. In some implementations, the different passwords may be generated by User Agent software from a single password provided by the user at the beginning of a session. In some implementations, a new password generated from the single password originally provided by the user may be used to authenticate every Internet or other network transaction between the user and a service provider's system.

The tenth embodiment of the invention is directed to a method of authenticating and securing every Internet or other network transaction between a new and/or previously unknown user and a service provider's system. In some implementations, authentication may include the use of different passwords. In some implementations, the different passwords may be generated by User Agent software from a single password provided by the new or previously unknown user at the beginning of a session. In some implementations, the single password may be provided by a temporary authentication device. In some implementations, a new password generated from the single password originally provided by the user may be used to authenticate every Internet or other network transaction between the user and a service provider's system.

The eleventh embodiment of the invention is directed to a computationally non-intensive Call initiation method. In some implementations, Authenticated Dialogue Initiation may allow a user to contact another party who is known or unknown to the user. In some implementations, the Authenticated Dialogue Initiation may be used to grant or deny the contacted party access to a User's system.

The twelfth embodiment of the invention is directed to the Automatic classification of users upon access to a service providers system. In this way, one or more stages of communication through the Internet may be eliminated.

BRIEF DESCRIPTION OF THE DRAWINGS

FIG. 4 illustrates VCS 5; Character Unit Serial Numbers (SNCU) of VCS 5=column number×10+row number. Column numbers are indicated in top row and row numbers are indicated in the leftmost column.

FIG. 5 illustrates VCS 6; Character Unit Serial Numbers (SNCU) of VCS 6=row number×10+column number. Column numbers are indicated in top row and row numbers are indicated in the leftmost column.

BRIEF DESCRIPTION OF THE TABLES

Figure 1:
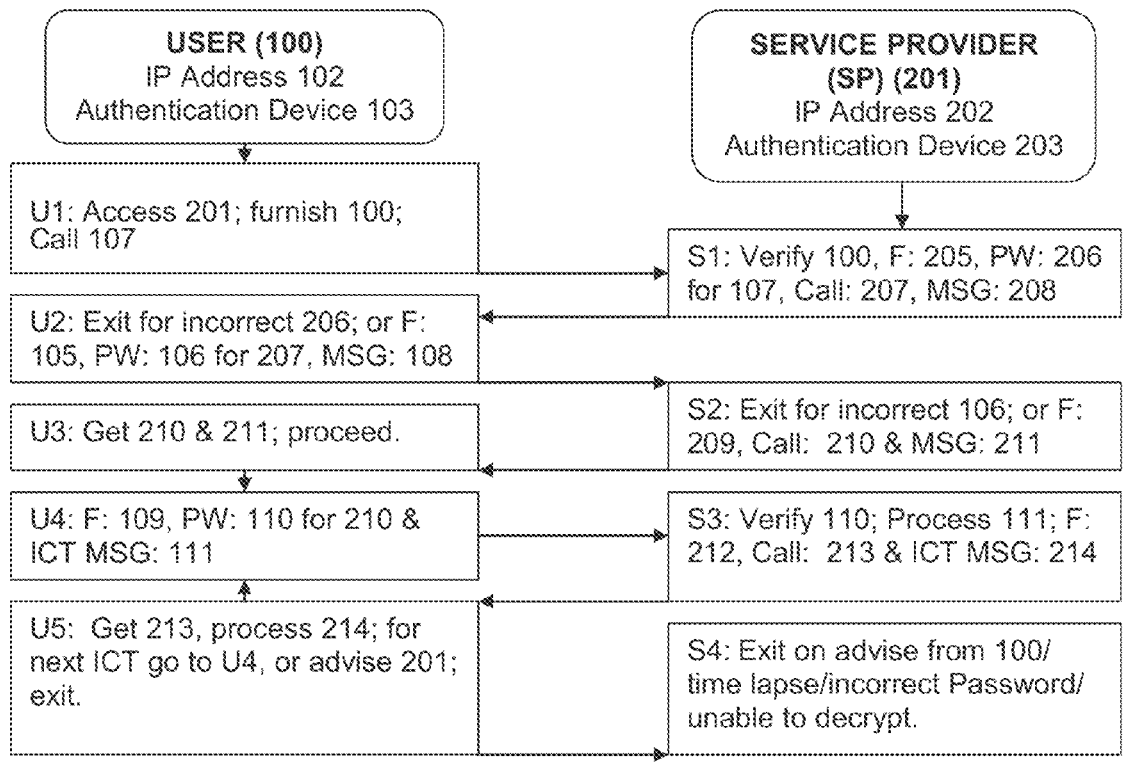
FIG. 1 illustrates a flow chart of a method of authenticating and securing each individual Internet Contract/Network transaction of a USER using one Password furnished by a USER for each transaction.

Table I, on page 80, shows VCS 1 through VCS 4;

Table IV-A and Table IV-B, on pages 84 and 82, respectively, show the relationship between Basic Characters, Character Units, a Variable Character Set and Passwords for VCS 1 through VCS 6; and Table V on page 83, shows MVCS 1.

DETAILED DESCRIPTION

A detailed description of the invention is provided below. While the invention is described in conjunction with specific embodiments, it should be understood that the invention is not limited to these specific embodiments. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that would be known to one of ordinary skill in the art has not been described in detail.

Definitions

For the purpose of this description, the technical terms used herein are defined below.

Access restriction: defines the portion of a SERVICE PROVIDERS system Which may be accessed by a USER during their session.

Authentication device: is used to generate a Password. The Authentication device includes a Variable Character Set and/or a Sub Variable Character Set of any level for the USER and a Master Variable Character Set, Variable Character Set, and/or Sub Variable Character Set of any level for the SERVICE PROVIDER.

Basic Character (BC): Is a single character used to form a Character Unit (CU). In some implementations, a Basic Character may be selected from any letter or symbol of an alphabet. In some implementations, a Basic Character may be a single digit number or numeral. In some implementations, a Basic Character may be selected from any language or script. In some implementations, the letter, symbol, or number from which a Basic Character is derived may be further varied by changing font type and/or through the addition of other distinguishing properties (e.g., bold, underline, color, font size, and/or italics) to the Basic Character. Basic Characters that rely on variations of the font and other distinguishing properties may also be referred to as a Basic Character with a font property variation. In some implementations, the Basic Character may include a representation of an object, for example, a diagram, drawing, image, photo, picture, and/or sketch of the object.

Bilaterally Generated Variable Instant Password System: is a variable password generation and authentication system. In some implementations, the system may be used to secure every Internet or other network transaction between a USER and a SERVICE PROVIDER'S system. In some implementations, the system may include CALL initiation, USER Classification, and access control. In some implementations, the Passwords are generated bilaterally between the USER and the SERVICE PROVIDER at the initiation of a transaction between the USER and the SERVICE PROVIDER. In some implementations, these bilaterally generated Passwords are unique for every transaction.

Bilaterally Generated Variable Instant Password (BIG-VIP): is a Password generated using the Bilaterally Generated Variable Instant Password system. In some implementations, during a Password CALL, the BIGVIP may be generated from any Character Unit of the Variable Character Set and/or Sub Variable Character Set of any level even if that Character Unit has been previously used to generate a Password.

CALL: may be between a SERVICE PROVIDER and a USER or between a USER and a SERVICE PROVIDER. In some implementations, the CALL will include one or more serial numbers for Character Units to which a RESPONSE is required. In some implementations, the RESPONSE will include Character Units pulled from the appropriate Authentication device using the provided serial numbers. Each serial number corresponds to a Character Unit. In some implementations, the serial numbers for a CALL are instantly generated at the initiation of the CALL. The number of serial numbers generated by the CALL may be equal to or less than the total number of Character Units provided by the Authentication device. In some implementations, the generation of the serial numbers may be affected by predetermined rules. In some implementations, the CALL may include an identification number for one or more Variable Character Sets and/or Sub Variable Character sets of any level.

Chance of Breach: is the probability of a person, other than the USER or SERVICE PROVIDER, to randomly input the correct password within the allowed number of chances. When the number of chances is unlimited, the Chance of Breach becomes 1 (i.e., guaranteed) regardless of a passwords complexity. This includes cases where the password remains unchanged following failed authentication attempt(s).

Character Unit (CU): is the basic unit of a Variable Character Set. The Character unit may consist of only one Basic Character. In some implementations, a Character Unit may consist of two or more Basic Characters. In some implementations, a Character Unit may be two or more Basic Characters having a font property variation. In some implementations, a Character Unit may be any random font property variation of any Basic Character or combination of Basic Characters.

Encryption keys: are used to encrypt information (objects) exchanged during a transaction between a USER and a SERVICE PROVIDER. In some implementations, the Encryption keys include (i) the one or more serial numbers generated at the initiation of a CALL and (ii) the Password entered in RESPONSE to the CALL during the course of a transaction.

Human User: is a USER who is human.

Internet Contract Transaction (ICT): is an internet transaction between a USER and a SERVICE PROVIDER having monetary value or other value (e.g., confidential information or proprietary information not having an immediately quantifiable monetary value). In some implementations, the ICT may rely on using a USER's account on a SERVICE PROVIDER's System. In some implementations, the ICT may rely on using a USER's account with other SERVICE PROVIDERs.

Master Variable Character Set (MVCS): is a Variable Character Set defined for use in a system as the Master Variable Character Set. In some implementations, the MVCS may contain all of the Character Units of all Sub Variable Character Sets. In some implementations the MVCS may contain all of the Character Units from which further Sub Variable Character Sets are derived.

Maintaining link: refers to a static connection or link that has been established between a USER and a SERVICE PROVIDER's System. This static connection or link is maintained from the beginning of a session until the end of a session. In this way, the USER and the SERVICE PROVIDER are ensured to be the same entities during the entirety of the session.

Mutual authentication: is where both a USER and a SERVICE PROVIDER, seeking to mutually authenticate each other, send a CALL to the other requesting a Password. In this way, both parties may individually authenticate the other. In some implementations, each CALL will require a unique password.

Network Transaction: is any Local Area or Wide Area Network transaction having monetary value or other value (e.g., confidential information or proprietary information not having an immediately quantifiable monetary value). In some implementations, the Network Transaction may rely on using a USER's account with a SERVICE PROVIDER. In some implementations, the Network Transaction may rely on using a USER's account hosted on a SERVICE PROVIDER's System with other SERVICE PROVIDERs.

Non-Repeating Bilaterally Generated Variable Instant Password (NRBIGVIP): is a Password generated using the Bilaterally Generated Variable Instant Password system. In some implementations, during a Password CALL, the NRBIGVIP may be generated from any previously unused Character Units of the Variable Character Set and/or Sub Variable Character Set of any level. In some implementations, the balance of Character Units not used to generate the NRBIGVIP may be used to generate future Passwords. In this way, no Password is a repeat of a previously generated Password.

Number of chances: is the number of times a USER or SERVICE PROVIDER may attempt to enter the correct Password in RESPONSE to a CALL. In some implementations, the Number of chances may be limited to one, two, or three. In some implementations, more than three chances may be permitted.

Objects exchanged between USER and SERVICE PROVIDER: The objects may include Passwords, CALLs, data packets, and/or files. In some implementations, an object may include a message packet generated during the course of a transaction (internet or Network transaction) and exchanged between a USER and a SERVICE PROVIDER.

Password: is either a Bilaterally Generated Variable Instant Password or Non Repeating Bilaterally Generated Variable Instant Password generated using the Bilaterally Generated Variable Instant Passwords system. In some implementations, the Password may be one or more Character Units. In some implementations, the one or more Character Units are retrieved from an Authentication device.

Password Safety Index (PSI): It is a number derived from the equation:

$$2^{(PSI)}=1/(\text{Chance of Breach}).$$

The Password Safety Index (PSI) may be used to compare the relative safety of two or more passwords in terms of bit size of an equivalent encryption system.

Previously unknown USER: is a USER who has yet to establish a user account with the SERVICE PROVIDER. In some implementations, a previously unknown USER may encompass USERs who are excused from establishing an account with the SERVICE PROVIDER (e.g., USERs relying on temporary or short term access to the SERVICE PROVIDERs system).

Providing proof of a transaction: Is where a record of each CALL and/or Password used during one or more transactions is generated and stored. This record may, at a later time, be used as proof of a transactions occurrence. In some implementations, this record may include the USER's Internet protocol address (IP address), date and time of the transaction, a USER's identifying information, and/or the IP address of the internet SERVICE PROVIDER and/or network server who forwarded the request of a previously unknown USER. In some implementations, the record may include details regarding objects exchanged between a USER and a SERVICE PROVIDER.

RESPONSE: is the reply transmitted by either a USER or SERVICE PROVIDER in reply to a CALL. In some implementations, the RESPONSE may include Character Units from an Authentication device. The Character Units selected from the Authentication device correspond to the serial mini hers transmitted as part of the CALL. In some implementations, the Character Units are entered as a continuous string in which the Basic Character(s) of a Character Unit are indistinguishable from the Basic Character(s) of another Character Unit. In some implementations, if the CALL includes an identification number specifying a Sub Variable Character Set of any level, then the RESPONSE may also include the identification number of the Sub Variable Character Set identified in the CALL.

SERVICE PROVIDER: is a person, a process, software, a specified sector(s) of data storage media, a system, a server, a network, and/or anything to which a USER may gain access upon furnishing a valid Password. The Password is used to authenticate the identity of the USER.

Sub Variable Character Set (SVCS): is a Variable Character Set derived from a Master Variable Character Set. All Character Units listed on a Sub Variable Character Set are derived from the Master Variable Character Set. In some implementations, a SVCS may be generated for use by a single USER or a category of USERs. Categories of USERs may be created by a SERVICE PROVIDER to limit a group (or category) of USERs to a designated portion of the SERVICE PROVIDER's System.

Sub Variable Character Set of Level 2, Level 3 or higher (SVCSL2, SVCSL3): are comprised of Character Units derived from the SVCS immediately preceding it. For example, a Sub Variable Character Set of Level 3 (SVCSL3) is derived from a Sub Variable Character Set of Level 2 (SVCSL2) that in turn is derived from a Sub Variable Character Set (SVCS). In some implementations, these SVCS of various levels may be limited for use with a specific USER or a category of USERs.

Stronger Password: As used herein refers to a Password having twice as many Character Units as compared to the Password formed from the serial numbers provided in the original CALL. In some implementations, a Stronger Password may be requested as part of a CALL in order to test if the USER has an Authentication device after a failed login attempt has occurred.

Temporary authentication device: is an authentication device sent by a SERVICE PROVIDER to a previously unknown USER. In some implementations, the temporary authentication device may be transmitted electronically (e.g., through the internet or another network server.)

Transaction: a transaction as used herein is an exchange of two objects that occurs between a USER and a SERVICE PROVIDER. In some implementations, the exchange of the two objects occurs consecutively. For example, one object is transmitted from the USER to the SERVICE PROVIDER and a second, consecutive object is transmitted from the SERVICE PROVIDER to the USER.

USER: is a person, a process, software, a specified sector(s) of data storage media, a system, a server, a network, and/or anything that may use a Password to authenticate its identity.

USER object: is a USER that is not human.

USER Agent Software: is software designed to represent a USER for the purpose of transacting with the SERVICE PROVIDER. In some implementations, the USER Agent Software may be integrated into internet contract transaction software or network transaction software. In some implementations, the USER Agent Software may be used to authenticate individual transaction, authenticate and exchange objects on behalf of a USER, receiving objects from a SERVICE PROVIDER, verifying the origination of all messages received from a SERVICE PROVIDER.

Variable Character Set (VCS): may be a list, table, array, and/or matrix which contain a number of Character Units. In some implementations, each character unit is identified by a serial number.

List of Abbreviations, Symbols and Conventions Used:
BC Basic Character.
BIGVIP Bilaterally Generated Variable Instant Password.
CU Character Unit.
ICT Internet Contract Transaction/Network Transaction.
IP address Internet Protocol address.
ISP Internet Service provider/Network Server.
LAN Local Area Network.
MVCS Master Variable Character Set.
NRBIGVIP Non-Repeating Bilaterally Generated Variable Instant Password.
SNCU Serial number of Character Unit.
SVCS Sub Variable Character Set.
SCVSLn Sub Variable Character Set of level n, wherein n is a number greater than 1.
PSI Password Safety Index.
VCS Variable Character Set.
VLN Very large number exceeding $10^{307}$.
WAN Wide Area Network.
To indicate plural "s" is added to all abbreviations.
= Equal.
+ Addition.
− Subtraction.
* or: × Multiplication.
÷ Division.
^ Exponential.
log N Logarithm of 'N' to the base 10.
$^nP_r$ Number of permutations of "r" objects out of a total of "n" objects.
7.86 E+07 $7.86 \times 10^7$ (Convention used for large numbers).

Henceforth, the terms "USER", "SERVICE PROVIDER", "CALL", and "RESPONSE" with all letters capitalized are used where the above defined meanings are applicable. Where, 'User' or 'user' and 'Service provider' or 'service provider' or their plurals occur, they denote only the persons, who are seeking authentication or a person or system, accepting authentication. All other technical terms will have their defined meanings throughout this description. In this description, excluding definitions, claims, and the abstract, wherever "Variable Character Set" is written, it is to be read as "Variable Character Set/Sub Variable Character Set of any level" and "VCS" may be read as "VCS/SVCS of any level" unless the context indicates otherwise.

Bilaterally Generated Variable Instant Password System:

In some implementations, the Bilaterally Generated Variable Instant Password System is a Password generation and authentication system that may be used to secure electronic transactions. In some implementations, the BIGVIP System may include authenticated CALL initiation.

In some implementations, a USER may be automatically classified upon accessing a SERVICE PROVIDERs system. In some implementations, the classification assigned by the SERVICE PROVIDER to a USER may be used to determine which portions, or sub domains, of a SERVICE PROVIDERs system that may be accessed by the USER. In this way, a USER may not need to furnish additional data (e.g., Passwords) to access controlled sub domains of the SERVICE PROVIDERs system.

In some implementations, the Bilaterally Generated Variable Instant Password System may be used to authenticate a USER, a SERVICE PROVIDER, each transaction initiated by a USER, and/or each object exchanged between a USER and a SERVICE PROVIDER during a transaction.

In some implementations, the BIGVIP System may include an independent symmetric encryption key system. In some implementations, the use of an independent symmetric encryption key system does not involve the exchange of encryption keys.

In some implementations, the Bilaterally Generated Variable Instant Password System may provide two different computationally non-intensive encryption keys for each transaction initiated by a USER. In some implementations, the encryption keys may be linked to the identity of the USER. In some implementations, the encryption keys may be used to secure the transactions of a USER. In some implementations, the BIGVIP system may be used to authenticate known USERS and previously unknown USERS.

In some implementations, the Bilaterally Generated Variable Instant Password System may be used to generate a plurality of different passwords from a single password provided by the USER at the beginning of a session. In some implementations, many new passwords are generated from the single password originally provided by the USER. The new passwords may be used to authenticate every Internet and/or other network transaction between a USER and the system of a SERVICE PROVIDER. In this way, the USER may be relieved from inputting additional Passwords to authenticate further transactions occurring during a session.

In some implementations, the Bilaterally Generated Variable Instant Password System provides a computationally non-intensive means for tracing objects to the originator.

In some implementations, the Bilaterally Generated Variable Instant Password System dispenses with Password memorization.

In some implementations, the Bilaterally Generated Variable Instant Password System uses a Variable Character Set system as an Authentication device.

In some implementations, the Bilaterally Generated Variable Instant Password System may include the authentication process, the authentication system, and/or the interface programs executable by the SERVICE PROVIDER and/or USER systems.

In some implementations, the Bilaterally Generated Variable Instant Password System is capable of generating Bilaterally Generated Variable Instant Passwords and/or Non Repeating Bilaterally Generated Variable Instant Passwords.

In some implementations, the Bilaterally Generated Variable Instant Password System may be used for the mutual authentication of a USER and a SERVICE PROVIDER.

In some implementations, access to the objects exchanged during an internet transaction is restricted to a specific USER and/or SERVICE PROVIDER. In some implementations, access to the objects is limited to a USER and/or SERVICE PROVIDER attempting a transaction from a specific IP address, respectively. In this way, continuity of the link between a USER and SERVICE PROVIDER is ensured thereby preventing unauthorized diversion of the link and/or substitution of the USER and/or SERVICE PROVIDER.

In some implementations, the authentication device of the Bilaterally Generated Variable Instant Password System may be used to authenticate every transaction of a previously unknown USER.

In some implementations, the Bilaterally Generated Variable Instant Password System may be used to control access to the system of a SERVICE PROVIDER.

In some implementations, the Bilaterally Generated Variable Instant Password System may be used in-lieu of Biometric authentication thereby avoiding repeated use of Biometrics.

In some implementations, a direct and computationally non-intensive CALL initiation method of using the Bilaterally Generated Variable Instant Password System is disclosed.

In some implementations, the Bilaterally Generated Variable Instant Password System may be configured to perform a number of authentication and transaction security based tasks, which include, but are not limited to:

1) Authentication of USERS for the purposes of securing (protecting) a Network, computer system, data, software, hardware, camera, mobile phone, and/or other similar devices. Authentication may also be used to restrict a USERS accesses to a SERVICE PROVIDERs system by assigning a classification to the USER. The assigned classification may be used to determine which portions, or sub domains, of a SERVICE PROVIDERs system the USER may access. In some implementations, Authentication may be used in place of Biometric authentication. In some implementations, Authentication includes mutual authentication of the SERVICE PROVIDER and a USER.

2) Functioning as an independent symmetric encryption key system.

3) Using encryption keys to secure transactions (e.g. Network Transactions) between a USER and a SERVICE PROVIDER. In some implementations, an encryption key may be one or more variable Passwords entered by a USER and/or a CALL made by a SERVICE PROVIDERs system. In some implementations, encryption may be used to secure every Internet Contract and/or Network Transaction between a USER and a SERVICE PROVIDER. In some implementations, encryption keys may be used in Maintaining the link between a USER and a SERVICE PROVIDERs system.

4) Using encryption to secure transactions (e.g., Network transactions) between a USER and a SERVICE PROVIDER. In some implementations, an encryption key may be one or more variable Passwords generated by the USER Agent Software from an initial Password entered by a USER and/or a CALL made by a SERVICE PROVIDERs system. In some implementations, encryption may be used to secure every Internet Contract and/or Network Transaction between a USER and a SERVICE PROVIDER. In some implementations, USER Agent Software may ire used to provide encryption for transactions originating from the USER. In some implementations, encryption keys may be used in Maintaining the link between a USER and a SERVICE PROVIDERs system.

5) Using encryption to secure transactions (e.g., Network Transactions) between a previously unknown USER and a SERVICE PROVIDER. In some implementations, encryption may be used to secure every Internet Contract and/or Network Transaction between an unknown USER and a SERVICE PROVIDER. In some implementations, a previously unknown USER may provide an initial password retrieved from a Temporary authentication device in RESPONSE to a CALL. In some implementations, encryption may include the use of a variable Password generated by a previously unknown USER using USER Agent Software. In some implementations USER Agent Software may be used to provide encryption for transactions originating from the previously unknown USER. In some implementations, encryption may include the use of two system generated Passwords and/or Encryption keys for each transaction. In some implementations, encryption may be used in Maintaining the link between a USER and a SERVICE PROVIDERs system.

6) Using Authenticated Dialogue Initiation as a means of verifying the admissibility of a known and/or unknown party (e.g. a USER or a SERVICE PROVIDER) seeking access to a system. In some implementations, the party seeking access to the system will be called. In this way, access to the system may be granted, denied, and/or limited.

7) Automatic classification of USERS upon access to a SERVICE PROVIDERs system. In this way, access to sub-domains of the system may be controlled and one or more stages of communication through the Internet may be eliminated.

To better understand the invention, the disclosure is arranged in the following order: Variable Character Set System of authentication devices, Authentication Process, Bilaterally Generated Variable Instant Passwords, Non-Repeating Bilaterally Generated Variable instant Passwords, Characteristics of a Bilaterally Generate Variable Instant Password System, advantageous benefits of the invention and a detailed description of various authentication methods that rely on. Bilaterally Generated Variable Instance Passwords.

Variable Character Set System of Authentication Devices:

In some implementations, the Bilaterally Generated Variable Instant Password System may use one or more Variable Character Set System of authentication devices to generate Passwords. In some implementations a USER and a SERVICE PROVIDER may have agreed to use at least one Variable Character Set as an authentication device. In some implementations, the Variable Character Set may be used to generate variable and/or instant Passwords. In some implementations, the Variable Character Set may be used by a SERVICE PROVIDER to verify the variable and/or instant Passwords input by a USER. In this way, access and/or services may be restricted only to authorized USERs.

In some implementations, the Variable Character Set system of authentication devices may include:
1) Variable Character Sets (VCS); and/or one or more of the following derivatives:
2) Master Variable Character Sets (MVCS)
3) Sub Variable Character Sets(SVCS)
4) Sub Variable Character Sets of Level 2 or above (SVCSL2, SVCSL3 . . . )

In some implementations the Variable Character Set system may include the following subsystems:
1) VCS for both a SERVICE PROVIDER and/or a USER.
2) MVCS with a SVCS expressed in brief form for a SERVICE PROVIDER and/or a SVCS for a USER.
3) MVCS with a SVCSL2 or higher expressed in brief form for a SERVICE PROVIDER and a SVCSL2 or higher for a USER.

In some implementations, a SERVICE PROVIDER may determine which of the three subsystems of the Variable Character Set system to use. In some implementations, an authentication device may be comprised of an arrangement of Character Units (CUs) in which each CU may be identified using a unique Serial Number assigned to each CU. In some implementations, the arrangement of the CUs is selected to provide variable Passwords formed from a selected number of CUs in which a CU could be repeated within a Password. In some implementations, CUs comprised of the same Basic Character(s) (BC) may be varied by using font property variation(s) of the one or more Basic Characters used to generate each CU.

Basic Character: in some implementations, a Basic Character (BC) is a single character used to form a Character Unit (CU) which is the basic unit of a Variable Character Set. In some implementations, a Basic Character may be selected from any letter or symbol of an alphabet. In some implementations, a Basic Character may be a single digit number or numeral. In some implementations, a Basic Character may be selected from any language or script. In some implementations, the Basic Character may include a representation of an object, for example, a diagram, drawing, image, photo, picture and/or sketch of the object. In some implementations, the letter, symbol or number from which a Basic Character is derived may be further varied by changing font type and/or through the addition of other distinguishing properties (e.g., bold, underline, color font size, and/or italics) to the Basic Character. Basic Characters that rely on variations of the font and/or other distinguishing properties may also be referred to as a Basic Character with a font property variation.

In some implementations, the BIGVIP System may recognize as unique a Basic Character that has been varied by changing font type and/or through the addition of other distinguishing properties (e.g., A, A (bold), A (underlined)). Each Basic Character may include a calculable number of variations based on the number of characters used, the number of font types, and/or additional distinguishing properties used. For example, if twenty (20) font colors, twenty (20) font types, ten (10) font sizes, underlined, and non-underlined characters are used they are 8000 (20×20×110× 2=8000) ways to vary a single letter, symbol, or number from which a Basic Character is derived.

A human USER may be able to recognize a color variation of a Basic Character. It is unlikely that a human USER, without prior knowledge, would recognize a font type, italics, bold, and/or font size variation of a Basic Character. This is because some font types look similar to other font types which are italicized. As another example, some large font sizes are difficult to differentiate when bold. As a result, in some implementations, font types and/or other distinguishing properties that may be difficult to recognize are brought to the attention of the human USER (e.g., printed on a VCS or displayed in conjunction with an electronic VCS). In some implementations, font types and/or other distinguishing properties may be chosen by the human USER. For example, in a Password, the font type of the first CU may be set to Arial, the second CU may be set to size 16, the third CU may be Bold, and/or the fourth CUs may be in Italics. As another example, in a VCS, all CUs in the first row may have an Arial font, all CUs in the second row may be size 16, and/or all CUs in the third row may be Bold.

In some implementations, USER objects may be able to recognize and distinguish between all font types and/or other distinguishing properties used to vary a Basic Character. In this way, the possible variations of a Basic Character used with a USER object may be much greater that what is possible for a human USER. In some implementations, non-computer systems such as cameras, mobile phones, etc . . . may be able to differentiate font property variations of Basic Characters through the use of hardware. The font property variations of a Basic Character may be limited by the USER's and/or SERVICE PROVIDER's ability to recognize the font types and/or other distinguishing properties (i.e. font property variation) used to modify the Basic Character.

USERs do not need to be conversant with a language or number system in order to use letters or numbers therefrom, respectively. In some implementations, human USERs may use scroll and/or drop down menus to select the letter, symbol, or number to be used as a Basic Character. In some implementations, the human USER may further vary a selected Basic Character by changing font type and/or through the addition of other distinguishing properties. In some implementations, a USER object may be programmed or otherwise configured to recognize virtually any Basic Character and/or font property variation thereof.

The generation of Character Units is a random process. In some implementations, the BCs that were initially used to generate one or more CU for a VCS may be excluded from all CU of a subsequently generated VCS. Even still, any BCs excluded from the CUs of a VCS may still be counted for the purposes of calculating the chance of breach and PSI (i.e., all Basic Characters initially used to generate Character Units are used). In some implementations the total number of BCs, and font property variation thereof, required for use in the generation of CUs used as part of a VCS is based on a minimum number set by the SERVICE PROVIDER. The minimum number of BCs may be selected to ensure that each USER of a SERVICE PROVIDERs system has at least one unique VCS and/or meets a minimum PSI value.

In some implementations, the Basic Characters may be selected from a character list without any variation of font type and/or additional distinguishing property. In some implementations, a Basic Character may be varied by font type and/or additional distinguishing property separately from the initial selection thereof.

In some implementations, only BCs which can be written and/or printed in a unique way should be allowed for use as CUs of a VCS. In this way, there is no confusion when a human USER is attempting to enter a Password generated from a VCS. Example characters which could be incorrectly read are: C, c, I, l, 1, K, k, o, O, 0, P, p, S, s, U, u, V, v, W, w, X, x, y, Z and z.

Here are a few example Basic Character sets:
1. A, e, 1, 9, &, @, $.
2. *A, e, 1, 9, &, @, $*.
3. A, e, 1, 9, &, @, $.

Even though the same set of characters are shown three (3) times in the above example, all three character sets exhibit font property variations of the same set of characters. The Basic Characters of the first character set have an Arial font, size 10 font, and are Bold. The Basic Characters of the second character set have a Times New Roman font, size 12 font, and are Italicized. The Basic Characters of the third character set have a Courier New font, size 11 font, and are underlined. Due to the variations of font type and other distinguishing properties (e.g., Bold, underlining, and/or italicizing) the Basic Characters of each set are unique. Additional font type and/or distinguishing property variations of Basic Characters are shown in example VCS 5 and VCS 6. For example, as shown in example VCS 6, characters from more than one language and number system, symbols, and pictures may be used as Basic Characters in a VCS.

Character Unit (CU): A CU is the basic unit of a Variable Character Set and may be comprised of one or more Basic Characters. In some implementations, a CU may be comprised of two or more BCs. By using two or more BCs, the USER may have to refer to a VCS less frequently to know the CUs from which the correct Password is comprised. For example, assuming a six character Password, a USER would have to refer to a VCS six times in order to know the correct characters if the CUs each consist of only a single BC. As another example, assuming a six character Password, a USER would have to refer to a VCS three times in order to know the correct characters if the CUs each consist of two BCs.

As the number of BCs required to form a CU are increased the number of variations between CUs is increased. An increased variation of CUs will also increase the number of unique VCSs that may be generated. In some implementations, CUs in a VCS may have a fixed number of BCs. In some implementations, up to 10 percent (10%) of CUs may have fewer BCs than the remaining CUs. For example, if a VCS has CUs comprised of three BCs up to 10% of the CUs could be comprised of one or two BCs. In this way, the variability of CUs may be increased. Examples of this may be seen in example VCS 2 and 4 shown as part of Table I.

Method of generating a Character Unit: In some implementations, the total number of BCs which will be used for generating all CUs may be set. Then, in some implementations, the number of BCs used to generate each CU is set. Next, in some implementations, the total number of CUs which will be used to create a Variable Character Set is selected. In some implementations, Basic Characters that a USER is able to read, and/or identify may be selected for use. In some implementations, the BCs may be selected based on the USERs ability to input them as a Password in RESPONSE to a CALL. The number of BCs and/or font property variations thereof used to create the CUs of a VCS must meet a minimum variation requirement set by the USER and/or SERVICE PROVIDER. In some implementations, the CUs are generated by random selection of one or more BCs. In some implementations, the CUs may be generated by a random font property variation of one or more BCs. In some implementations, the generated CUs of a VCS may collectively use all of the initially selected BCs. In some implementations, a BC and/or a font property variation of a BC may be used within the same CU.

As an example, let A through Z, without any font type and other distinguishing property variation, represented the initially selected Basic Character set. Each BC may then be assigned a serial number (e.g., 1=A, 2=B, 26=Z). Then, the number of BCs per CU is decided. Using provided software, a series of random numbers selected from the serial numbers assigned to each BC are generated (e.g., 2, 1, 26, 3). For Character Units comprised of a single BC, the randomly selected serial numbers are replaced with their corresponding BCs. Using the above random serial numbers, the Character Units would be B, A, Z, C, respectively. Using the above example serial numbers, if each Character Unit is comprised of two Basic Characters the Character Units would now be BA and ZC, for example.

Additional example Character Units are shown on VCS 1 through VCS 4 of Table I, VCS 5 shown in FIG. 4, and VCS 6 shown in FIG. 5.

Variable Character Set (VCS): may be a list, table, array, and/or matrix which contain a number of Character Units. In some implementations each Character Unit of a VCS may be identified by a unique serial number (SNCU). In some implementations, a VCS may only be known to a USER and/or SERVICE PROVIDER. In some implementations, a VCS may be made known (e.g., through an ISP) to an unknown party and used to verify their identity. In some implementations, a VCS may have a large number of CUs (e.g., 100). In implementation where a VCS is organized by rows and columns, the serial number of the Character Unit (SNCU) may be assigned in a manner which facilitates easy identification of the correct CU.

In some implementations, a SERVICE PROVIDER may specify the rules related to the generation of a Character Unit and thereby the resulting Variable Character Set. Example rules may limit variations of the BCs, the font property variations that may be applied to BCs, and the number of BCs per CU.

In some implementations, no relationship exists between Character Units and the serial number of each Character Unit. Similarly, no relationship exists between two or more Character Units of a VCS as the CUs are randomly generated. As a result, unauthorized parties may be prevented from extrapolating other CUs of a VCS should some of the CUs become known to them.

Simple Variable Character Sets are shown in VCS 1 through VCS 4 of Table I. Complex Variable Character Sets are shown in VCS 5 of FIG. 4 and VCS 6 of FIG. 5. The complexity of the VCS generated is based on requirements set by the SERVICE PROVIDER and/or the preferences of the human USER. If a VCS is safeguarded from unauthorized access it may be used for a long time without replacement. In some implementations, the generation of a new VCS may be a simple process should there be a need to do so. In some implementations, the VCS may be printed on a physical medium such as paper. In some implementations, the VCS may be provided as an encrypted file form stored in the memory of a device accessible to a USER in some implementations, a SERVICE PROVIDER may store a VCS in digital form and/or similar means in the memory of a device. In some implementations, for USER objects (e.g., a camera), the VCS may be embedded into its memory.

Method of generating a VCS: Initially, in some implementations, the number of CUs used to generate a VCS is decided on by the USER and/or SERVICE PROVIDER. In some implementations, the number of CUs decided on may be based on the type of Password (repeating or non-repeating), number of CUs in a Password, and/or PSI. The CUs generated by the method described above may be arranged sequentially or randomly. In some implementations, the CUs used to generate a VCS may be arranged in anyone of the following formats: list, table, array, and/or matrix. In some implementations, the method of identifying and/or calculating the serial number of each CU may also be specified.

Master Variable Character Set (MVCS): is a Variable Character Set defined for use in a system as the Master Variable Character Set. In some implementations, the MVCS may contain all of the Character Units of all Sub Variable Character Sets. In some implementations, the MVCS may contain all of the Character Units from Which further Sub Variable Character Sets are derived. In some implementations, multiple VCS may be derived from a single MVCS. In some implementations, VCS derived from a MVCS may be referred to as a Sub Variable Character Set (SVCS). In some implementations, a USER may be allowed to create a SVCS from a MVCS. In some implementations, the MVCS may be generated from a combination of all SVCSs for all USERs in a system. In this way, the MVCS may be a continuous and non-overlapping list of SVCSs. In some implementations, a MVCS may be used as the principle authentication device for all USERs. In some implementations, a MVCS in combination with a SVCS may be used to generate variable, instant Passwords for the BIGVIP system. In some implementations, a MVCS in conjunction with one or more SVCS may be used to generate Passwords in lieu of Variable Character Sets.

Method of generating a MVCS: Initially, in some implementations, the number of CUs used to generate a MVCS is decided on by the SERVICE PROVIDER. In some implementations, the number of CUs decided on may be based on the type of Password (repeating or non-repeating), number of CUs in a Password, and/or PSI. In some implementations, the MVCS may be generated in the same manner as described in connection with the generation of a VCS except that a larger number (e.g., 200+) of CUs are used. In some implementations, two or more USERs may be allowed to create two or more SVCSs which are then combined to create a MVCS. In this way, the MVCS may be a continuous and non-overlapping list of all SVCSs of all USERs of a system. As an example, MVCS 1 is shown in Table V.

Sub Variable Character Set (SVCS): A Sub Variable Character Set may be used in combination with a MVCS to generate Passwords in a BIGVIP system. In some implementations, a SVCS in combination with a MVCS may be used as an alternative to VCSs which is a substantial advantage to SERVICE PROVIDERs. In this way, instead of storing a VCS for each USER only a single MVCS may be stored for one or more groups of USERs thereby minimizing data storage. In some implementations, an SVCS may be designated for use by a single USER and/or a category of USERs. In some implementations, the SVCS may be derived from a MVCS generated by a SERVICE PROVIDER. In some implementations, each SVCS may have any number of CUs derived from the MVCS.

In some implementations, a SERVICE PROVIDER may define the rules used to generate a SVCS. In some implementations, a SERVICE PROVIDER may assign a serial number to identify each Character Unit of the MVCS. In some implementations, discrete, continuous, and/or random sequences of CUs selected from the MVCS may be used to generate a SVCS. In some implementations, between SVCSs there may be a few mutually non-exclusive CUs. The number of mutually non-exclusive CUs should be limited so that no relationship is established between SVCSs derived from the same MVCS. The extent to which mutually non-exclusive CUs may be used between SVCS is limited in order to prevent the establishment of a specific relationship between SVCSs originally derived from a single MVCS.

In some implementations, a SVCS may be generated by selecting CUs from a MVCS as described above. In some implementations, the rules used to generate a SVCS may be integrated as part of a program used to generate SVCSs. In some implementations, the Serial Number of each CU of a SVCS may be independent of the Serial Number of the same CU on the MVCS.

In some implementations, a prefix and/or suffix may be used to identify from which SVCS of a particular MVCS a Password was generate from.

In some implementations, a USER may be allowed to create a SVCS. In some implementations, a USER may create a SVCS in the same manner as a VCS. For a USER there is no functional difference between an individual VCS and a SVCS.

In some implementations, through the use of a MVCS a SERVICE PROVIDER may be relieved of the need to maintain and store separate SVCSs. In some implementations, a SERVICE PROVIDER may only maintain a list of serial numbers used to identify the CUs of a SVCS associated with a MVCS. This will result in the use of less memory and/or storage space being used to store the SVCSs. In some implementations, when a SVCS is identified primarily by the serial numbers of the CUs of a MVCS it may be done so as a sequence of two (2) serial numbers for two CUs. In this way, a SVCS may be represented more briefly than a VCS relying on the same number of CUs.

In some implementations, USERs may be given a complete SVCS. In some implementations, the SVCS may have CUs identified by serial numbers which may be different than the serial numbers used to identify CUs of the MVCS. In some implementations, a Password CALL may include two or more serial numbers corresponding to CUs of a USERs SVCS. In some implementations, a USER may enter the identified sequence of CUs as a Password. The SERVICE PROVIDER will verify that the CUs entered by the USER correspond to the CUs of the MVCS after correlating the serial numbers of the CUs of the USERs SVCS with the serial numbers of the CUs of the MVCS. In some implementation, when validating a Password, a validating program of the system verifies that the serial numbers of the CUs of the SVCS in use correspond to the CUs of the MVCS.

In the event a SVCS is compromised or physically stolen, the MVCS will remain unchanged and a new SVCS may be generated therefrom.

Below are three example SERVICE PROVIDER rule sets that may be used to generate Sub Variable Character Sets (SVCS).
a) All CUs of a MVCS whose serial numbers are between 57 and 157 and are even numbers.
b) All CUs of MVCS whose serial numbers are between 39 and 88 and written in descending order.
c) All CUs of MVCS whose serial numbers are between 47 and 295 and Modulus (i.e., modular arithmetic) (serial number of a character unit, 5)=3, etc.

Example SVCS that are identified by the serial numbers of the CUs of a MVCS. MVCS 1 has been used to generate 50 CUs for a SVCS in the following manner.

| SVCS Identification | SNCUs forming SVCS | Number of SNCUs, which represent SVCS |
| --- | --- | --- |
| AA | 1 to 50 | 2 |
| AB | 46 to 95 | 2 |
| AC | 91 to 140 | 2 |
| AD | 136 to 185 | 2 |
| AE | 181 to 231 | 2 |
| AF | 226 to 275 | 2 |
| AG | 271 to 300, 1 to 5, 75 to 80, 130 to 137, 49, 167 | 8 |
| AH | 183 to 192, 27 to 36, 254 to 263, 130 to 139, 75 to 84 | 10 |

From the above example is can be seen that a SVCS may be represented in a more concise manner than a VCS (see, e.g., VCS 1 of Table I) having the same number of CUs. It may also be seen that multiple SVCS may be derived from a MVCS where each SVCS may not be comprised of a proportional number of CUs. The eight (8) SVCS shown above are represented by a total of 30 Character Unit serial numbers derived from a single MVCS. Instead of storing 8×50=400 CUs, only 300 CUs and 30 serial numbers identifying CUs need be stored. In this way, data storage may be reduced.

Sub Variable Character Set of Level 2 or higher (SVCSL2, SVCSL3 . . . ): A SVCS of level 2 or higher may be used in combination with a MVCS to generate Passwords in a BIGVIP system. In some implementations, a SVCS of level 2 of higher in combination with a MVCS may be used as an alternative to VCSs which is a substantial advantage to SERVICE PROVIDERs. A SVCS of level 2 or higher is a derivation of a SVCS and may be used by any USER or subgroup of USERS specified by the SERVICE PROVIDER. In some implementations, a SVCS of level 2 or higher may be generated for and used by a subgroup of a subgroup of USERS.

In some implementations, generating SVCS of level 2 or higher may be similar to generating a SVCS from a MVCS for a SERVICE PROVIDER. In some implementations, a USER may select the CUs that will be used as part of a SVCS of level 2 of higher from the CUs of a SVCS immediately preceding it in priority. In some implementations, the SVCS from which a USER may select CUs is provided by the SERVICE PROVIDER.

In some implementations, as with SVCS described above, a SVCS of level 2 or higher may be maintained as a list of CU serial numbers by the SERVICE PROVIDER. In some implementations, a SERVICE PROVIDER may specify the rules used to generate a SVCS of level 2 or higher. In some implementations, the rules used to generate a SVCS of level 2 or higher may be in terms of CU serial numbers. In this way, a SVCS of level 2 or higher may be represented more briefly than a VCS relying on the same number of CUs. In some implementations, when a SVCS of level 2 or higher is identified primarily by the serial numbers of the CUs of a MVCS it is done so as a sequence of two (2) serial numbers for two CUs.

In some implementations, USERs may be given a complete SVCS of level 2 or higher. In some implementations, a Password CALL may request two or more CUs from an identified SVCS of level 2 or higher. The provided serial numbers will identify the correct CUs on the identified SVCS of level 2 or higher. In some implementation, when validating a Password, the validating program of the system verifies that the serial numbers of the CUs of the SVCS of level 2 or higher in use correspond to the CUs of the MVCS.

In the event a SVCS of level 2 or higher is compromised or physically stolen, the MVCS will remain unchanged and a new SVCS of level 2 or higher may be generated therefrom.

Combined use of MVCS and SVCSs: In some implementations, a SERVICE PROVIDER may register one MVCS within the system and define rules for the generation of one or more SVCSs. In some implementations, a SERVICE PROVIDER may generate one or more SVCS for each USER or group of USERS accessing the system. In some implementations, a SERVICE PROVIDER may generate a SVCSs for future USERS. In some implementations, the MVCS may be used to generate SVCS instead of storing a VCS for each USER or group of USERS. In some implementations, the one or more SVCSs derived from a single MVCS may have fewer CUs therein than the MVCS. In some implementations, a list of CU serial numbers for SVCS generated from a MVCS may be kept in place of a complete SVCS as described above. In this way, the amount of data storage required to store each SVCS is reduced.

In some implementations, each VCS has a unique set of CU serial numbers (SNCUs) which may not relate to any other VCS. SNCUs of separate VCSs may be unique, their referral, calling the values in to software programs etc., have to be different for each VCS. The serial numbers of the CUs for each VCS may be unique. When a SERVICE PROVIDER's system (e.g., software program) attempts to verify a Password entered by a USER each VCS must be loaded into memory in order to facilitate the comparison of the Password's CUs entered by the USER and the CUs that correspond to the serial numbers sent as part of a CALL. SNCUs of MVCS representing the SVCSs are unique. Referral, calling the values in to software programs etc., is same for all SVCSs. The serial numbers of CUs for a MVCS may be unique. When a SERVICE PROVIDER's system (e.g., software program) attempts to verify a Password entered by a USER, only a single MVCS must be loaded into memory in order to facilitate the comparison of the Password CUs retrieved from associated SVCSs and entered by the USER against the CUs that correspond to the serial numbers sent as part of a CALL.

In some implementations, each VCS may have to be separately defined within a SERVICE PROVIDERs system. In implementations where a SVCS is used this is not required. In this way, the CU serial numbers and/or CUs of a SVCS may be easy to identify and results in fewer lines of code within a program.

In implementations where USERs are allowed to create SVCSs, the MVCS and SVCS arrangement may be used to facilitate the association of a SVCS with a MVCS. In implementations where USERS are allowed to create SVCSs, the MVCS and SVCS arrangement may allow for the automatic classification of USERs on access to a SERVICE PROVIDERs system. The MVCS and SVCS arrangement may be useful when separate authentication is required of a USER attempting to access specific sub-domains within a SERVICE PROVIDERs system.

Combined use of MVCS and SVCS's of level 2 or higher: The use of a MVCS in combination with a SVCS of level 2 or higher is similar to the use of a MVCS in combination with a SVCS are discussed above. In some implementations, the use of a MVCS in combination with a SVCS of level 2 or higher may further reduce the amount of data storage space required. (as compared to the reduction in data storage achieved through the use of a MVCS in combination with one or more SVCS).

Distinct features of a VCS system of authentication devices: In some implementations, the VCS system allows for the use a virtually unlimited combination of characters from any language or script, number or numeral and/or diagram, drawing, image, photo, picture, and/or sketch of the object in some implementations, a VCS is comprised of a number of Character Units where each CU may be comprised of one or more Basic Characters (e.g., 42 or more CUs would be ideal because the chance of guessing a 4 CU Password in three attempts would be greater than 1 in a million). CUs of the VCS authentication device may each be identified by CU serial numbers. In some implementations, there is no upper limit on the number of CU serial numbers. In some implementations, the authentication device does not require any outside device or instruction to locate and read the CUs from which a Password may be comprised. In this way, the use and expense associated with additional reading devices and/or graphical user interfaces may be avoided. In some implementations, the Password characters are directly reproduced from the authentication device. In some implementations, all CUs have a predefined number of characters which remains unchanged and unaffected by algorithms.

Using a printed authentication device dispenses with the need to memorize CUs. Further, a printed authentication device means that the number of CUs and/or CU serial numbers used is not constrained by human memory. In some implementations, the CUs from which an authentication device of a VCS system is comprised are not selected by an algorithm or other pattern forming method. Further, algorithm and/or other pattern forming methods are not required to produce a Password using an authentication device of the present invention. In some implementations, an authentication device may be used to produce a plurality of Passwords one after the other. In some implementations, the authentication device may be used to generate a series Passwords in succession in order to authenticate every transaction taking place in a session.

In some implementations, an authentication device provides for storing a Master Variable Character Set and a Sub Variable Character Set of any level in brief form using only the CU serial numbers of the SVCS and/or SVCS of any level. In some implementations, an authentication device may facilitate automatic classification of a USER on access to a SERVICE PROVIDERs system. In some implementations, an authentication device may facilitate the generation of multiple Passwords from a single Password initially inputted by a USER. In this way, the Passwords generated from the initial Password provided by a USER may be used to authenticate every Internet transaction.

A password system using the VCS system as described herein may be unbreakable as a result of the large variation of characters and combination of characters from which a Password may be comprised. However, in order to further minimize and/or prevent a breach of the Bilaterally Generated Variable Instant Password System, two methods are provided:

1) A method of varying the Basic Characters of a Variable Character Set being used as an Authentication Device without printing a new Variable Character Set.
2) Transformation of a Variable Character Set.

A method of varying the Basic Characters of a Variable Character Set being used as an Authentication Device without printing a new Variable Character Set: In some implementations, a USER may optionally propose changes to the font type and/or other distinguishing properties (e.g., bold, underline, color, font size, shading, and/or italics) used to vary a Basic Character of a VCS. In this way, multiple variations may be made of the same character used as a CU of a VCS of any level. In some implementations, the SERVICE PROVIDER may optionally accept the change(s) or reject them.

In some implementations, a SERVICE PROVIDER may at regular intervals make changes to the font type and/or other distinguishing properties (e.g., bold, underline, color, font size, shading, and/or italics) used to vary one or more Basic Characters of a VCS.

In some implementations, a USER may use a separate transparent sheet in conjunction with a printed Variable Character Set and/or Sub Variable Character Set of any level. In some implementations, the transparent sheet may be positioned to overlay the Authentication Device and thereby the Variable Character Set and/or Sub Variable Character Set of any level. In this way, a two part Authentication device comprised of the printed Variable Character Set and/or Sub Variable Character Set of any level and the transparent sheet is created. On this transparent sheet, variations to the font type and/or other distinguishing properties being made to the CUs are recorded. In some implementations, the transparent sheet and thereby the new variations (changes) of the CUs may be kept separately from the Variable Character Set and/or Sub Variable Character Set of any level.

In some implementations, changes to the font type and/or other distinguishing properties (e.g., hold, underline, color, font size, shading, and/or italics) used to vary a Basic Character of a VCS may be made at any time and/or any number of times. The flexibility provided by being able to change the font type and/or other distinguishing properties (e.g., bold, underline, color, font size, shading, and/or italics)

of a letter, symbol, or number from which a Basic Character is derived, as described above, helps to secure a VCS against compromise.

When using the two part Authentication Device described above, should the VCS be stolen and/or lost it would not be usable by an unauthorized party that did not also have access to the transparent sheet. In some implementations, the two part Authentication Device may allow a VCS to be used for a longer period of time.

Transformation of a Variable Character Set: is an optional method of instantly generating new CUs from a VCS in RESPONSE to a CALL. In some implementations, the transformation of a VCS may include the application of rules on the CUs of a VCS to thereby transform the CUs into new CUs. In this way, the VCS may be secured against theft or compromise. In some implementations, transformations may be done to either Basic Characters and/or Character Units.

A few example implementations of transformation (or transforming) rules:

Character Unit serial numbers may be transformed by talking one or more Character Unit serial numbers of a VCS and adding 27 to each Character Unit serial number. Applying this rule to the Character Unit serial numbers of VCS1 shown on Table I, will result in, Character Unit serial numbers 1, 2, and 15 becoming Character Unit serial numbers 28, 29, and 42, respectively. The Character Unit serial numbers start over in instances where the addition of 27 to the Character Unit serial number would result in a serial number exceeding the serial number range of the VCS. For example, Character Unit serial number 74 of the VCS1 would be transformed into Character Unit serial numbers 1 not 101. As another example, Character Unit serial number 99 of the VCS1 would be transformed into Character Unit serial number 26.

Another example transformation rule may transform the Character Unit serial numbers by subtracting 10 from each Character Unit serial number. Applying this rule to the Character Unit serial numbers of VCS1 shown on Table I, will result in, Character Unit serial numbers 91, 92, and 99 becoming Character Unit serial numbers 81, 82, and 89, respectively. The Character Unit serial numbers start over in instances where the subtraction of 10 from a Character Unit serial number would result in a serial number becoming negative relative to the serial number range of the VCS. For example, Character Unit serial number 1 of the VCS1 would be transformed into Character Unit serial numbers 91 not −9. As another example, Character Unit serial number 3 of the VCS1 would be transformed into Character Unit serial number 93.

When the transformation of a CU serial number results in a negative number the total number of CU serial numbers is added to the negative number to obtain the transformed CU serial number. When the transformation of a CU serial number results in a number exceeding the total number of CU serial numbers, the total number of CU serial numbers is deducted therefrom to obtain the transformed CU serial number.

In some implementations, transformation may be performed on the letter of one or more Basic Characters. For example, a transformation rule may specify that all "A"s are to be transformed to "E", all "B"s are to be transformed to "F", and all "C"s are to be transformed to "C".

In some implementations, rules may vary in complexity. In some implementations, a combination of transformation rules may be applied to a VCS. In some implementations, the transformation rules may be changed at any time. In some implementations, changes to the transformation rules may need to be registered with the SERVICE PROVIDER. In some implementations, any physical record of the transformation rules should be kept separately from the original VCS. In some implementations, a USER may memorize the transformation rules.

In some implementations, in RESPONSE to a CALL, a USER may furnish CUs from a transformed VCS. In some implementations, a SERVICE PROVIDER may set the transformation rules. In some implementations, transformation rules may be used in addition to varying the font type and/or other distinguishing properties of the Basic Characters.

Authentication Process: in some implementations, the authentication process may be used to verify "what the user has" in order to authenticate the identity of a USER. In some implementations, the USER and SERVICE PROVIDER use a pre-agreed to Variable Character Set System authentication device to generate Passwords and CALLS. In some implementations, the Password may comprise a plurality of unique CUs from the authentication device. Optionally, in some implementations, CUs may appear more than once in a Password.

During Authentication, in some implementations, a USER may initiate a transaction with a SERVICE PROVIDER by accessing a website, dialogue window, and/or switching on a system. Then, in some implementations, the SERVICE PROVIDER may ask the USER to furnish a USER name and/or identification number (e.g., a credit card number). If the USER name and/or identification number is unregistered (i.e. not recognized by the SERVICE PROVIDER), the SERVICE PROVIDER may prompt the USER to furnish the correct USER name. In some implementations, the SERVICE PROVIDER may deny a USER access to a system if repeated (e.g., three) login attempts fail. In some implementations, after a USER name recognized by the SERVICE PROVIDER is entered, the SERVICE PROVIDER's system may then refer to a pre-agreed to VCS associated with the entered USER name and therefrom randomly select a specified number of CU serial numbers. The number of CU serial numbers selected may be equal to or less than the total number of CUs on the VCS. The CU serial numbers may also be selected in view of predetermined rules (e.g., non-repetition of random numbers) set by the SERVICE PROVIDER. Then, the SERVICE PROVIDER may transmit the randomly selected CU serial numbers to the USER, this step may also be referred to as a CALL. Next, the USER, referring to his authentication device, will enter a RESPONSE to the CALL that comprises a sequence of CUs (i.e., Password) that correspond to the CU serial numbers received as part of the CALL The CUs of the Password will be arranged in the same sequence as the CU serial numbers were during the CALL. In some implementations, the Password is comprised of a continuous sting of CUs. In this way, the BCs of each CU are indistinguishable from the BCs of other CUs comprising the Password.

In some implementations, a CALL may also comprise an identification number associated with a Sub Variable Character Set of any level. In some implementations, a RESPONSE may include an identification number associated with a Sub Variable Character Set if the CALL included an identification number associated with a Sub Variable Character Set. In some implementations the SERVICE PROVIDER verifies that the CUs and SVCS identification number provided as part of the USERS RESPONSE is correct and corresponds to the pre-agreed to VCS identified during the CALL Once the CUs and SVCS identification number are matched to the pre-agreed to VCS the USER has been authenticated.

In some implementations, if the provided CUs and/or SVCS identification number do not match, the USER may be given additional (e.g., three) chances to furnish the correct Password. In some implementations, if the USER fails to provide the correct Password within the specified number chances the transaction may be aborted and subsequent authentication attempts may be delayed. In some implementations, authentication attempts initiated by a USER after the SERVICE PROVIDER aborts a transaction may not be made until a specified amount or time has elapsed and/or may require the USER to furnish two correct Passwords in reply to successive CALLs. In some implementations, if a USER is unable to complete the authentication process after an initial SERVICE PROVIDER aborted transaction the USER may be denied access to the SERVICE PROVIDER'S system until the USER is able to establish his identity/authenticity to the satisfaction of the SERVICE PROVIDER through other means.

Below is an example Authentication dialogue occurring over the Internet between a USER (e.g., USER 1) and a SERVICE PROVIDER (e.g., SP1). In this example, the USER and SERVICE PROVIDER have pre-agreed to use "VCS 1":

USER1 has opened the website of SP1, indicating his desire to initiate a transaction with SP1.
SP1: "Please enter vow USER name"
USER1: "USER1"
SP1: "70, 31, 43"
USER1: "©×ImrA"
SP1: "Welcome USER1" (Welcome implies that USER1 has furnished the correct Password).

Below is another example authentication dialogue over the Internet between a USER (e.g., USER 1) and a SERVICE PROVIDER (e.g., SP1). In this example, the USER and SERVICE PROVIDER have pre-agreed to use "VCS 1". In this example, USER 1 enters an incorrect Password three times and reattempts to initiate a transaction with SP1:

USER1 has opened the website of SP1.
SP1: "Please enter your USER name"
USER1: "USER1"
SP1: "4,100, 43"
USER1: "ZADJRA"
SP1: "The Password you furnished is incorrect. Please enter the correct Password for 4,100, 43."
USER1 "zadjra"
SP1: "The Password you furnished is incorrect. Please enter the correct Password for 4,100, 43."
SP1: "Reminder: Last Try."
USER1: "ZaDjRa"
SP1: "Sorry. You have furnished an incorrect Password thrice. ACCESS DENIED. You may retry after 2 hours."
USER1 after 2 hours has opened the website of SP1.
SP1: "Please enter your USER name"
USER1: "USER1"
SP1: "71, 34, 85, 29, 96, 52. Reminder: Only one chance is allowed."
USER1: "FmOvcIwlb1×P"
SP1: "Welcome USER1" (Welcome implies that USER1 has furnished the correct Password)

Below is yet another example authentication dialogue over the Internet between a USER (e.g., USER 1) and a SERVICE PROVIDER (e.g., SP1). In this example, the USER and SERVICE PROVIDER have pre-agreed to use a "SVCS" identified as "AA" having character unit serial numbers 1 to 50 of MVCS 1 (see Table V below):

USER1 has opened the website of SP1.
SP1: "Please enter your USER name"
USER1: "USER1"
SP1: "19, 44, 13, Id. of SVCS"
USER1: "VFRU64AA"
SP1: "Welcome "USER1" (Welcome implies that USER1 has furnished the correct BIGVIP)"

Thus a Password is formed in an easy manner, using the VCS System of Authentication Devices. In some implementations, the Passwords are generated at the instant a USER initiates a transaction with a SERVICE PROVIDER's system.

Bilaterally Generated Variable Instant Passwords: In some implementations, a Bilaterally Generated Variable Instant Password (BIGVIP) may be generated using the BIGVIP System. In some implementations, CU serial numbers and thereby the CUs associated therewith may be used during the generation of an initial BIGVIP and subsequently generated Bilaterally Generated Variable Instant Passwords without restriction. Even with unrestricted use of CU serial numbers. Bilaterally Generated Variable Instant Passwords rarely repeat. For example, when VCS1 of Table I is used to generate a six (6) character Password the chance of the Password being repeated is one (1) in a million. Further, the chance of repeating a BIGVIP is equal to that of any other variable Password comprised of the same Basic Characters. In this way, a Password may remain unused even when stolen because it would not be practical to predict when a CALL requesting the same Password would occur again. In some implementations, font property variations may be made to the PCs of the CUs a VCS at any time and/or any number of times after the VCS is issued by the SERVICE PROVIDER.

Methods of generating a BIGVIP: In some implementations, a BIGVIP may be generated by a SERVICE PROVIDER and/or USER having a data processor loaded with software that implements the system/methods of the BIGVIP system. In some implementations, the SERVICE PROVIDER and USER may be connected over a communication network (e.g., the Internet) during the generation of a BIGVIP. In some implementations, a device (e.g., a camera) may include embedded software that is used to generate a BIGVIP.

In some implementations, a SERVICE PROVIDER's system may include a program that selects random CU serial numbers from the pre-agreed to VCS and validates the selected CU serial numbers against any specified rules. In some implementations, after a USER enters a BIGVIP in RESPONSE to a CALL, a SERVICE PROVIDER's system admits or rejects the authentication attempt(s) based on the provided Password corresponding to the CU serial numbers sent as part of the CALL. In some implementations, the SERVICE PROVIDER's system may limit (e.g., three) the number of authentication chances for each USER attempted transaction. In some implementations, a SERVICE PROVIDER's system may include software which records and generates a report(s) containing all Password CALLS and include therewith a time and the number of failed attempts. In some implementations, a SERVICE PROVIDER's system may include software that validates by accepting or rejecting font property variations and/or Transformation of the VCS initiated by the USER.

Non-Repeating Bilaterally Generated Variable instant Passwords (NRBIGVIP): some implementations a Non-Repeating Bilaterally Generated Variable Instant Password (NRBIGVIP) may be generated using the BIGVIP System. In some implementations, the sequence of CU serial numbers, and thereby the sequence of CUs associated therewith, used to generate an initial Non-Repeating Bilaterally Generated Variable Instant Passwords may never again be used to generate a Password during a CALL (i.e., a Password will never be repeated).

In some implementations, a BIGVIP System generated NRBIGVIP has restrictions on the repeated use of CUs. For example, in a CALL where a NRBIGVIP is generated, a fixed number of CUs (e.g., 2 out of 3 CUs) used during a previous CALL may be used repeatedly for subsequent CALLs to a USER. But, the balance of unused CUs (e.g., 1 out of 3 CUs) may only be used once for the generation of NRBIGVIPs.

In implementations where identification of the SVCS being used is required as part of the authentication process, the SVCSs identification information may be included with the CUs of the NRBIGVIP in the same manner as described with other passwords generated using the BIGVIP System. In this way, if someone were to know the CUs of a USER's VCS they would still be unable to furnish the correct Password in reply to a CALL.

In some implementations, font property variations of BCs and/or Transformation of a VCS may be used in conjunction with the generation of a NRBIGVIP. In some implementations, a VCS may be exhausted when the last CU thereof has been called for the first time. BCs of a CU that have had font property variations applied thereto are considered new CUs. A VCS where the CU serial numbers have been Transformed are considered new CUs. Therefore, through Transformation of a VCS and/or the addition of font property variations to the BCs, a VCS may be revived.

Methods of generating a NRBIGVIP: In some implementations, the software used to generate a NRBIGVIP may be similar to the software used to generate a BIGVIP as described above with the following additions. In some implementations, a SERVICE PROVIDER's system maintains a list of CU serial numbers already used during a CALL for each VCS and thereby prevents those CU serial numbers from being repeatedly called. In some implementations, the SERVICE PROVIDER's system maintains a list of CU serial numbers that have not been used during a CALL for each VCS. In this way, a CALL may use a CU serial number Which has not been previously used during the generation of a NRBIGVIP.

In some implementations, the software used by the SERVICE PROVIDER and/or USER will provide both parties with advance notice regarding the impending exhaustion of a VCS being used to generate NRBIGVIPs. In some implementations, the software may prompt a USER to apply font property variations to the BCs of the CUs associated with a VCS and/or apply Transformation rules to the CU serial numbers.

Methods of Authentication:

Generating multiple Passwords from one Password: USER Agent Software may use a single Password entered by a USER to generate one or more Password(s) for each transaction occurring during a session with a SERVICE PROVIDER. In some implementations, the USER Agent Software may reside in a USER's data processor. In some implementations, the Authentication device may use the same number of BCs for each CU thereon. In this way, the number of CUs comprising a Password may be easily identifiable. In some implementation, the initial CALL may include a minimum of four (4) CU serial numbers. In this way, at least 60 unique BIGVIPs may be generated from a SVCS by using 2 CU, 3 CU, and/or 4 CU serial numbers during each CALL.

In some implementations, a USER's data processor may be used to generate multiple Passwords from a single Password. In some implementations, the USER's data processor may collect the initial CALL and initial Password from the USER. The number of CUs in the initial Password and the number of CU serial numbers (SNCUs) of the CALL may be determined from the initial CALL and the initial Password. In some implementations, the USER's data processor may then form a SVCS of any level using all CUs obtained from the CALL as specified above. Next, in some implementations, the USER's data processor may assign a CU serial number to each CU. The CU serial numbers are then communicated to the SERVICE PROVIDER using the Password obtained above as an encryption key. In some implementations, the same procedure may be used for the generation of temporary SVCSs. In some implementations, when the CU serial numbers (SNCUs) of the first CALL are used as CU serial numbers (SNCUs) of a SVCS of any level the assignment of CU serial numbers and the communication thereof to the SERVICE PROVIDER is unnecessary. The SVCS generated as set forth above by a USER's data processor may be used as the authentication device for that session with the SERVICE PROVIDER. In some implementations, all CALLs during an ongoing session with the SERVICE PROVIDER will use Passwords generated from CU serial numbers of the authentication device generated for that particular session. An example of this method is given below using VCS 3 of Table I.

SERVICE PROVIDER's CALL: 51,133, 27,150, 48, 44
USER's RESPONSE (Password): AmRQ5o

|  | SNCU | | | | | |
| --- | --- | --- | --- | --- | --- | --- |
|  | 16 | 37 | 58 | 79 | 100 | 121 |
| CU | A | m | R | Q | 5 | o |

SVCS formed:

The CU serial numbers (SNCUs) are assigned by the USER's data processor independently of the SERVICE PROVIDER and then communicated to the SERVICE PROVIDER. When a SERVICE PROVIDER's CALL is unexposed (i.e., an encrypted transmission), then 51, 133, 27, 150, 48, 44 are useable as CU serial numbers.

Example of CALLs using the SVCS shown above:
(i) 79, 16, 58, 100; (ii) 121, 37, 16; (iii) 79, 37; (iv) 16, 58, 100, 79, 121, 37

RESPONSEs to the above CALLs:
QAR5; (ii) omA; (iii) Qm; (iv) AR5Qom

The above SVCS is capable of providing 1950 unique Passwords. Further, an additional 1949 unexposed CALLs are also available to secure objects exchanged during transactions occurring between the USER and SERVICE PROVIDER. In this way, 3899 encryption keys (Passwords) may be generated from this SVCS.

USER Agent Software: In some implementations USER Agent Software is software used by the USER to complete one or more transactions with a SERVICE PROVIDER. In some implementations, the USER Agent Software may be integrated into internet contract transaction software or network transaction software (ICTs). In some implementations the USER Agent Software may be a standalone program. In some implementations, the USER Agent Software may be used to authenticate individual transactions, authenticate and exchange objects on behalf of a USER, receive objects from a SERVICE PROVIDER, and/or for verifying the origination of all messages received from a SERVICE PROVIDER. In some implementations, the USER Agent Software may be assigned a temporary USER name based on the IP address of the computer being used to access a SERVICE PROVIDER's system. In some implementations, USER Agent Software may be used to perform all authentication tasks and/or secure all transactions associated with an ICT authentication process.

The Passwords act as an independent symmetric encryption key system: In some implementations, each Password is useable as an encryption key. The encryption key is not exchanged between the USER and SERVICE PROVIDER in advance because the encryption key is formed by the USER or SERVICE PROVIDER at the instant of the transaction during a CALL that is known to both the USER and the SERVICE PROVIDER. In this way, as a result of the encryption key being formed during the call, the encryption key does not need to be exchanged in advance of the CALL. Since a plurality of keys may be generated simultaneously and/or in quick successions using the authentication system and authentication device described herein, the resources (e.g., computer processing and memory) required to manage individual encryption keys and the exchange of these encryption keys for USER transactions is reduced. In some implementations, the encryption keys are computationally non-intensive and the SERVICE PROVIDER may adapt the encryption system to work in a variety of ways as described herein (e.g., authentication, for securing each individual transaction between a USER and SERVICE PROVIDER, etc . . . ). Another advantage of the present encryption system is that the inverse of an encryption key is a set of random numbers that when unexposed acts as a new encryption key that may be used to secure transactions and objects exchanged during transactions.

Internet Contract Transaction/Network Transaction (ICT): ICTs are Internet transactions between a USER and a SERVICE PROVIDER having monetary value or other value (e.g., confidential information or proprietary information not having an immediately quantifiable monetary value). In some implementations, a SERVICE PROVIDER may provide a USER with a USER account, USER name, and VCS after the USER accepts the terms and conditions of a contract between the USER and the SERVICE PROVIDER. An ICT may include any and all Internet transaction between a USER and SERVICE PROVIDER where the USER is using an USER account.

In some implementations, a temporary USER that does not have SERVICE PROVIDER established USER account, USER name, and VCS may still transact using their account with an ISP/Network Server after getting their system access request forwarded to the SERVICE PROVIDER by the ISP/Network Server. ICTs may include, for example, transactions using a credit card, debit card, bank transactions, share market transactions, purchases, sales, payments, receipts, gifts, bets, sending/receiving emails accessing information on websites, downloading articles, and/or sending or receiving data packets and/or files. In some implementations, there may be three methods of authenticating ICTs as detailed below:

Authenticating each individual transaction between a known USER and a SERVICE PROVIDER: In some implementations, the BIGVIP System may authenticate each transaction by (i) obtaining a correct Password from a USER for each transaction and/or by (ii) generating multiple Passwords from a single Password initially furnished by a USER. Authentication method (i) may be used for automated transactions between systems (e.g., between a non-human USER and SERVICE PROVIDER) and for securing transactions that require individual Passwords generated directly from an authentication device. Authentication method (ii) may be used for all ICTs between a known USERS and the SERVICE PROVIDER that are not specific to method (i).

Authentication of each individual transaction between a previously unknown USER and a SERVICE PROVIDER: A previously unknown USER is a USER who has yet to establish a USER account with the SERVICE PROVIDER. In some implementations, a previously unknown USER may encompass users who are excused from establishing an account with the SERVICE PROVIDER (e.g., users relying on temporary or short term access to the Service providers system). For example, a onetime USER may be a participant in an auction. In some implementations, the BIGVIP system includes a method that may be used to confirm the identity of a previously unknown USER based on the USERS account with an ISP. In some implementations, a temporary authentication device and a CALL are transmitted through the ISP, an access-restricted folder, after the ISP authenticates the USER to the SERVICE PROVIDER. In this way, a SERVICE PROVIDER may provide a Password directly to a USER for the purpose of opening the access-restricted folder. Once the Password has been retrieved, the USER may then open the access-restricted folder and furnish the Password in reply to the SERVICE PROVIDERs CALL. In this way, a previously unknown USER may become an authenticated temporary USER of the SERVICE PROVIDERs system. Next, in some implementations, each of the transactions occurring between the authenticated temporary USER and the SERVICE PROVIDER may be authenticated through the generation of multiple Passwords using the initial Password furnished by the temporary USER.

Objects may be secured during transactions between a USER and a SERVICE PROVIDER: In some implementations of the BIGVIP system, a CALL may be a variable sequence of random numbers (e.g., CU serial numbers) that is made for every transaction between a USER and a SERVICE PROVIDER. In some implementations, the sequence of random numbers may be used as additional variable Password(s) and/or encryption key(s). In this way, the CALL may be used to secure transactions. For example, in some implementations, the BIGVIP System may facilitate the exchange of objects through the use of folders/packets containing unexposed CALLs, Passwords, files, and/or messages.

In some implementations, the initial CALL may be sent in an unencrypted form. Then, the Password for the initial CALL may be used as the first encryption key. In this way, the first object exchanged between a USER and a SERVICE PROVIDER has been encrypted. In some implementations CALLs made subsequent to the initial CALL are transmitted or sent in encrypted form and are therefore unexposed. In this way, all Passwords and all CALLs, other than the initial CALL, are unexposed and useable as encryption keys.

In some implementations, two encryption keys may be available for each transaction. For example, during a CALL (an encryption key) being used to authenticate an object exchange request from the USER to the SERVICE PROVIDER and a Password (an encryption key) for the transmission of the object from the SERVICE PROVIDER to the USER. However, Passwords and unexposed CALLs may be used to secure any transaction occurring subsequent to the initial transaction. In some implementations, a CALL and/or Password being used for encryption or restricting access to a specific system folder may be limited by prior agreement between a USER and SERVICE PROVIDER.

In some implementations, cryptographic methods are used for encryption and/or decryption using the encryption keys (CALLs and/or Passwords). In some implementations, the cryptographic method may have been pre-agreed to. In some implementations, a combination of encryption as well as access restriction may be used to make objects inaccessible even to a user who is in possession of a decryption key. In some implementations, an encryption key may be different than a Password. Which is why a Password may be tested separately by the BIGVIP system.

Access restriction and ensuring continuity of link: In some implementations, access restriction is achieved by ensuring that the IP address of a USER, USER Agent Software, and/or SERVICE PROVIDER remains the same from the beginning to the end of a session. In some implementations, access restriction may also include a USER and/or USER Agent Software transmitting a Password to a SERVICE PROVIDER for each object transmitted from or received by the USER. In some implementations, method used by the BIGVIP system to restrict access to a specific IP address(es) may be configured to detect and prevent access to a SERVICE PROVIDER's system by USERS that are using a masked IP address, continuously changing IP addresses, proxy servers, and/or similar techniques. In some implementations, access restriction to specific folder may also be done when required.

Authenticated Dialogue Initiation: In some implementations, a VCS that is to be used for Authenticated Dialogue Initiation has to be very large (e.g., 200 of more CUs) and be published or hosted on a server. In some implementations a USER intending to initiate dialogue with another party may initiate a CALL using the CU serial numbers of the designated VCS. Then, the non-USER party may use the VCS to furnish the correct Password and thereby gain preferred access (e.g., preferential access to system resources). In some implementations, if the non-USER party furnishes an incorrect Password they could be blocked from gaining access to a USER's system and/or be granted non-preferred access (e.g., accesses is subordinated to those with preferential access to a system's resources) based on the USER's preference.

Automatic Classification of USERs upon accessing a SERVICE PROVIDER's system: In some implementations, the arrangement of a MVCS and SVCS may be used by a SERVICE PROVIDER to enable Classification of USERs upon access. In some implementations, a Password alone may identify a SVCS and thereby a USER subgroup. In this way, the Password alone may identify the portion(s) of a SERVICE PROVIDER system accessible by a USER. In this way, the access classification of a USER may be done without obtaining further information from the USER or the need to retrieve other previously stored information.

Characteristics of a Bilaterally Generated Variable Instant Password System.

Relationship between BCs, CUs, VCS and Password characteristics: Shown in Tables IV-A & IV-B are sample calculations for VCS 1 through VCS 6 (shown on Table I, FIG. 3, and FIG. 4) which detail the relationship between CUs, BCs, and VCSs. Also shown in Tables IV-A & IV-B are characteristics of BIGVIPs and NRBIGVIPs as they relate to VCS1 through VCS6. The calculations are explained in greater detail using VCS 1 for reference and indicating the relevant columns of Tables IV-A & IV-B.

Regarding Table IV-A and Table IV-B:

Column 1 list the serial number, Column 2 list the serial number of the VCS, Column 3 list the BCs used to form the VCS (e.g. VCS 1: A to Z, a to z, 0 to 9, @ and $), Column 4 list the total number of BCs used for the VCS (e.g., 64 in VCS 1), Column 5 list the number of BCs used for each CU (e.g., 2 BCs for each CU of VCS1), Column 6 list the total number of CUs in the VCS (e.g., 100 for VCS 1), and column 7 list the number of CUs used for each Password (e.g., a 4 CU Password comprised of 8 BCs is shown in VCS1).

Column 8: Using 64 BCs total with each CU being comprised of 2 BCs the her of possible unique CU permutations would be 4096 ($64^2$). This assumes that BCs are repeated within the same CU (e.g., when "R" is a Basic Character, "RR" could be a CU).

Column 9: There are $100^4$ (100,000,000) possible Password combinations for generating a 4 CU Password comprised of 8 BCs that may be selected from all CUs shown in VCS1. This assumes that CUs are repeated in the generated Passwords.

Column 10: If someone knew the BCs used to generate a VCS (e.g., VCS1) their chance of randomly creating the correct 4 CU Password being requested for a CALL would be the inverse of the number of ways of choosing eight single BCs successively out of 64 BCs. For Example $1/(64^8)$ Which equals $1/2.81E+14$.

Column 11: Assuming a USER has three (3) opportunities to enter the correct Password, the chance of breaching the Password given three opportunities would be $1/(2.81 E+14/3) = 1/9.38E+13$.

Column 12: A Password safely index (PSI) is $\log(9.38 E+13)/\log(2) = 46$.

Column 13 and 14: When 3 CUs out of 4 CUs are now-repeating the total number of 4 CU (8 BC) Passwords that could be generate from VCS1 is $100/3 = 33$.

Column 15: If someone knew one CU and the BCs used to generate a VCS (e.g., VCS1) their chance of randomly creating the correct 4 CU Non Repeating Password being requested for a CALL in three chances would be $3/64^{(2 \times 3)}$) which equals $1/2.29E+10$.

Column 16: PSI for a NRBIGVIP is calculated by $\log(2.29 E+10)/\log(2)$ which equals 34.

Column 17: The number of possible VCSs may be calculated using the number of font property variations that may be applied to the number of possible character units (e.g., 4096) and the total number of CUs (e.g., 100). This number (4096 P 100 exceeds $1 \times 10^{307}$ which is a very large number (VLN).

Based on the above relationships billions and billions of 100 CU VCSs, each of which are unique, may be formed using only 64 BCs.

For VCS 5, through the use of font property variations, the total number of BCs may be calculated as follows:

When using 64 BCs with 20 font types, 10 font sizes, 20 font colors, and underlined text or not, there are a total of 512,000 ways in total to write the 64 BCs (e.g., $64 \times 20 \times 10 \times 20 \times 2 = 512,000$). The chance of randomly picking any single BC with the font property variations applied above is $1/512,000$.

For VCS 6, through the use of font property variations, the total number of BCs may be calculated as follows:

When using 64 BCs (e.g., Basic Characters selected from English/Latin characters and 0-9) with 20 font types, 10 font sizes, 20 font colors, and underlined text or not there are a total of 512,000 ways in total to write the 64 BCs (e.g., $64 \times 20 \times 10 \times 20 \times 2 = 512,000$). The chance of randomly picking any single BC with the font property variations applied above is 1/512,000. When using 61 BCs (e.g., Greek, Arabic, and other characters) with 10 font sizes, 20 font colors, and underlined text or not, there are a total of 24,400 ways in total to write the 61 BCs (e.g., 61×10×20×2=24,400). The chance of randomly picking any single BC with the font property variations applied above is 1/24,400. An implementation of a variable characters set, such as VCS 6, which uses the combination of 125 BCs as described in this paragraph would decrease the chance of a BC being randomly selected to 1/536,400.

In view of the above provided calculations and after a review of Tables I through IV-B, the following relationship between CUs, BCs, a VCS, and a Password have been established.

As the total number of BCs used for the generation of CUs is increased the number of possible unique CUs and thereby VCSs that may be generated increases. In this way, the chance of breach may be reduced and the PSI may increase.

Through the application of font property variations to BCs the variability and thereby the number of BCs may be increased.

As the number of BCs that may be used for each CU is increased the number of possible CUs also increases. In this way, the number of possible VCSs also increases.

As the total number of CUs in a VCS is increased the total number of unique CUs used to generate a Password is increased. As the total number of CUs used to generate a Password is increased the total number of possible unique Password is increased. In this way, the PSI may also increase.

The PSIs of a BIGVIP and a NRBIGVIP are no comparable because the only non-repeating BCs (or CUs) of the NRBIGVIP are taken into account.

Approximately 100 CUs may provide enough variability to generate a million or more unique Passwords.

The calculations above assume that a person attempting to guess a Password and thereby breach a SERVICE PROVIDER's system know the BCs used for forming a VCS. Due to the variability of the BCs used as part of the BIG system, it may be impossible for anyone to guess the BCs used and thereby guess the Password (or breach the system).

A VCS provides a flexible way by which the strength of a Password may be varied (i.e., the number of CU serial numbers used during a CALL may be varied or a required PSI may be specified.) In some implementations, a designable Password system is envisioned. In some implementations, the selection of BCs, CUs, and the generation of VCSs, or design of Passwords are based on similar calculations (e.g., the need to generate a Password having a minimum PSI value).

Advantages of Font Property Variations on BCs, CUs, a VCS, and Passwords are Explained Below:

VCS 5 has the same characters as VCS 1 but includes the following font property variations: 20 font types, 10 font sizes, 20 font colors, and underlined or not characters. With these font property variations the number of ways in which any single character may be written is 8000 (1×20×10×20×2=8,000). A comparison between VCS 1 and VCS 5, as extracted from Tables IV-A and IV-B, respectively, is shown below.

|  | VCS 1 | VCS 5 | Ratio |
| --- | --- | --- | --- |
| Total no. of BCs | 64 | 512,000 | 8000 |
| Total no. of CUs per VCS | 100 | 100 | 1 |
| Number of possible CUs | 4096 | 2.62E+11 | 6.40E+07 |

-continued

|  | VCS 1 | VCS 5 | Ratio |
| --- | --- | --- | --- |
| No. of BCs per Password | 8 | 8 | 1 |
| No. of possible Passwords if all CUs in a VCS are used. | 1.00E+08 | 1.00E+08 | 1 |
| No. of Unique Passwords if all BCs are used | 2.81E+14 | 4.72E+45 | 1.68E+31 |
| Chance of 3 Random Trials on all CUs. 1in/ | 9.38E+13 | 1.57E+45 | 1.68E+31 |
| Password Safety Index (BIGVIP) | 46 | 150 | 3.23 |

As can be seen in the above examples, by increasing the number of BCs that may be used to generate CUs and thereby VCSs the difficulty of guessing a Password having only eight (8) BCs increases significantly. In this way, the present system provides for Passwords that are harder to randomly select than is provided for by 128-bit encryption systems. Thus, through the application of font property variations to the BCs Password variability is significantly increased. In this way, the present system provides an enormous advantage.

Variability of Passwords generated using the BIGVIP System: CUs provide an initial level of Password variability that is greater than what is available to existing Dynamic password systems second level of variability is created by varying the number of BCs used for each CU. In this way, one VCS provides flexibility in the generation of a Password using CUs therefrom. Each CALL may include a random number of CU serial numbers (e.g., 2-4 CUs per CALL) which provides a third level of variability to the Passwords. The variability of each VCS (e.g., through the transformation of a VCS and/or the application of font property variations to the BCs as detailed above) provides a fourth level of variability to the Passwords.

The BIGVIP system offers flexibility for the generation of Passwords: A VCS may be used for any number of USER accounts. In some implementations, the relative strength of a Password may be increased or decreased by varying the number of CU serial numbers transmitted as part of a CALL. The system described herein allows for the provision of any number of Passwords with or without human intervention. In some implementations, the BIGVIP system may be used by any kind of USER (e.g., humans and devices). Therefore, the BIGVIP system is a highly flexible Password system.

Security of Passwords generated by a BIGVIP System: The chance of breach is one (1) for a static Password, about 1 in 10^12 for an eight character Dynamic password, with the BIGVIP system having a much lower chance of breach (see the above examples).

The chance of breach is a fixed value for Dynamic password systems because the number of characters from which a Password may be comprised is fixed. In some implementations of the BIGVIP system, the chance of breach is variable through the use of BCs from a variety of alpha-numeric systems and through the application of font property variations. NRBIGVIPs are used up before anyone may steal them. Since there is no way to predict when a particular Password generated using the BIGVIP system will be reused the theft of a particular Password would be of little value. As a result of the four levels of variability outlined above and through the use of a large variety of BCs it is exceptionally difficult to guess a Password and thereby breach a system secured thereby. In some implementations, complete self reliant security is available because Passwords generated by the BIGVIP system are used as encryption and no external encryption is necessary.

Cost of adopting BIGVIP System: In some implementations, the USER may not bear an expense directly related to the use of the BIGVIP system. In some implementations, the SERVICE PROVIDER may incur minimal additional expense when implementing the BIGVIP system. These expenses may be due to additional data storage needed for the VCSs used as part of the system and software used to make CALLs and obtain and compare Passwords. The BIGVIP system may be marginally more expensive to implement than a static password system but it is cheaper to implement than existing Dynamic password systems, One-time password systems, and Biometrics systems.

Distinct features of the BIGVIP System: In some implementations, the BIGVIP system integrates many functions. In some implementations, the BIGVIP system may be used to authenticate and secure transactions between a USER and a SERVICE PROVIDER, provide for computationally non-intensive CALL initiation, USER classification on access to a SERVICE PROVIDERs system, and be used as a symmetric encryption key system. In some implementation, the BIGVIP system may be used to authenticate a USER for an entire session, for each transaction, and/or object exchanged between a SERVICE PROVIDER and USER during a transaction. In some implementations, the BIGVIP system provides two different, computationally non intensive, symmetric encryption keys linked with a USERS identity that may be used to secure each Internet and/or network transaction of a USER. The CALL includes a plurality of CU serial numbers that serve as an encryption key. In this way, two different ways of two-way authentication are possible using the BIGVIP system. The BIGVIP system may be used to secure each Internet and/or network transaction of a USER that was previously unknown to a SERVICE PROVIDER in a manner similar to that as used for a known USER. In some implementations, the BIGVIP system may be designed to generate many different Passwords from a single initial Password inputted by a USER. In this way, the USER may be relieved from inputting the many Passwords which are required to authenticate and secure every transaction and/or object exchanged between a USER and a SERVICE PROVIDER. In some implementations, the BIGVIP system provides a direct and computationally non-intensive means for tracing objects to the originator and thereby providing definite proof for solving an Internet transaction related claim and/or crime.

In some implementations, the BIGVIP system may request the USER to input two Passwords during a single CALL after a previously failed authentication attempt. In this way, the BIGVIP system is attempting to verify that the USER has the appropriate authentication device after a failed login attempt. In some implementations, the BIGVIP system may notify a USER of a failed login attempt.

Advantageous benefits of the Invention: In some implementations, no separate software is required for Password generation. In some implementations, the USER does not need any special hardware device in order to use the BIGVIP system. The BIGVIP system does not require a battery, initialization, unlocking, resynchronization, etc. . . . as do many prior art authentication systems. In some implementations, there may be no relationship between successive Passwords generated h the BIGVIP system. In some implementations there is no need for a separate server to validate Passwords. In some implementations, there is no need to synchronize a USER and a SERVICE PROVIDER. The BIGVIP system does not rely on the memorization of a PIN and the inputting of a Pin during use of the BIGVIP system. In some implementations, validation of a Password is computationally non-intensive as it is just a comparison. In some implementations, the BIGVIP system does not require alternate channels to transmit Password(s).

Example Modes of Carrying Out the Invention

Method of authentication and access restriction of USERs: The authentication function may be used to protect: networks, computer systems, data, software, hardware, cameras, mobile phones, and similar devices. In some implementations, a SERVICE PROVIDER may restrict a USE to specific portions of their system. The Bilaterally Generated Variable Instant Password system may generally be characterized as a system that controls access to objects and transactions occurring during a session between a USER and SERVICE PROVIDER. In some implementations, a USER's access to a SERVICE PROVIDER's system may be limited to a specified sector of data storage media by the SERVICE PROVIDER. In some implementations, the BIGVIP may be used by a SERVICE PROVIDER to limit which programs on their system may be executed by a USER.

In some implementations, at least one Variable Character Set may be used for each access control module. In some implementations, a second VCS may be used to authenticate a USER. In some implementations, the second VCS may be used for eventualities such as the loss of a VCS and/or the transfer of ownership or situations so as to allow an owner, manufacture, and/or system administrator to bypass the original USER's Password. This second VCS may only be used after the owner, manufacturer, and/or system administrator is legally permitted.

In some implementations, the software and/or software used to operate hardware may be designed to initially form and subsequently modify a Variable Character Set. In some implementations, the BIGVIP system allows a USER to require authentication of a SERVICE PROVIDER. Authentication is completed by allowing the USER to issue a CALL to which the SERVICE PROVIDER must respond to with a correct Password.

In some implementations, the BIGVIP system provides for a substantially enhanced level of access control for the SERVICE PROVIDER and/or USER. Remote commands, programs, and/or any objects seeking to access or modify core programs in a computer system are denied access because screening and access control is done to the level of individual objects, through the use of ICTs authentication, and/or Authenticated Dialogue Initiation.

Alternate method of authentication avoiding repeated use of Biometrics:

In some implementations, a NRBIGVIP is usable in place of biometric authentication. The chance of breaching a NRBIGVIP generated by the present system may be less than what is achievable through the use of biometrics. Font property variations and/or Transformation of a VCS may be used to enhance security.

Use as an Independent Symmetric Encryption Key System: The BIGVIP system may be used as an Independent Symmetric Encryption Key system without any additional changes to a SERVICE PROVIDES system. Only the inverse keys (i.e. CALLS) need to be exchanged between a USER and/a SERVICE PROVIDER. In some implementations, only the first inverse key may be exchanged in unencrypted form. In some implementations, the inverse keys may be comprised of random numbers that are only decipherable by the USER and SERVICE PROVIDER.

Internet Contract Transactions/Network Transactions (ICT): During Internet Contract Transactions and/or Network Transactions a few common procedures may be used. These procedures may include restricting access and thereby securing transactions and/or objects exchanged during a session. In some implementations, transactions and/or objects may also be secured by ensuring the continuity of the link between a USER and a SERVICE PROVIDER and/or through the generation of multiple Passwords from a single initial Password as explained above. A few more procedures which may be used when securing ICTs are described below:

Chance to correct: In some implementations, a Password entered in reply to a CALL is verified for correctness with a pre-agreed to number of chances being allowed for the correct Password to be entered. If the correct Password is not entered within the given number of chances, the SERVICE PROVIDER, USER, and/or USER agent software may end the authentication attempt. In some implementations, a Password may need to be entered in reply to a CALL within a specified time. Failure to do so may result in the SERVICE PROVIDER, USER, and/or USER agent software ending the authentication attempt. In some implementations, when an authentication attempt is ended, the party failing to complete authentication may be notified.

Checking objects exchanged: it is an optional step to check objects exchanged between a USER and a SERVICE PROVIDER before accepting and/or saving the files to their respective systems. The checks may be used to comply with regulations, contract conditions, and freedom from undesirable programs like virus.

The methods of using Bilaterally Generated Variable Instant Passwords will be readily understood by reviewing the following description in conjunction with the appended drawings wherein like reference numeral designate like structural elements. Only the main method steps and important details are shown in the accompanying drawings (i.e., FIGS. 1-3). Additional detail regarding the method steps disclosed below may be found elsewhere in the present specification. Ancillary steps, modifications to the method steps, and/or further individualization of the method steps may be made to adapt the method steps to the individual preferences of a USER and/or SERVICE PROVIDER.

A method of authentication and securing each individual Internet Contract/Network transaction of a USER using one Password furnished by a USER for each transaction: FIG. 1 illustrates a flow chart of this method. In this method there is a USER 100 having a USER account with a SERVICE PROVIDER (SP) having a website 201 configured to facilitate Internet Contract/Network transactions.

In step (U1), the USER 100 accesses the SP's website 201 by opening the website window. Upon accessing the SP's website 201, the USER 100 records the IP address 202 of the SP, furnishes the USER's Name 100 to the SP, refers to the authentication device 103, and issues a Call 107 to the SP using the authentication device 103. This Call 107 is termed as the initial Call of the session. This Call 107 is made over an open network, is considered exposed, and is unusable as an encryption key.

In step (S1), the SERVICE PROVIDER checks the provided USER name 100 to see if it is unregistered or registered. If the USER 100 name is registered, the SP records the IP address 102 of the USER 100, locates the appropriate authentication device 203 pertaining to the USER 100, checks whether the Call 107 is within (e.g., the number of CU serial numbers does not exceed the number of CUs of the authentication device) the authentication device 203, if the Call is beyond (e.g., the number of CU serial numbers in a Call exceeds the number of CUs of the authentication device) the authentication device 203, refers back. If the Call 107 is within the authentication device 203 the SP creates a folder 205 containing the appropriate Password 206 for the Call 107. The Call 207 termed as the SERVICE PROVIDER's first Call and any messages 208 that may be communicated to the USER 100 by the SP are encrypted by the SP. When the first Call and/or message 208 is communicated to a USER 100, the SP encrypts the folder 205 using the Password 206 and thereby limits access to the folder 205 to the USER contacting the SP from the IP address 102 of the USER 100.

In step (U2), the USER 100 opens and decrypts the folder 205 using a pre-agreed to cryptographic method and the Password 206, which is obtained from the authentication device 103. Then, the USER checks the Password 206 and exits if the Password 206 is incorrect. If the Password 206 is correct, a folder 105 containing a Password 106 for the Call 207 and any message 108 to the SP is created. When a message 108 is communicated to the SP, the folder 105 containing the message 108 may be encrypted using the Call 207. The encrypted folder 105 may only be accessed from the SP's IP Address 202 using the Password 206. The folder 205 is then sent to the SP.

In step (S2), the SP opens and decrypts the folder 105, verifies the USER provided Password 106, and exits if the authentication of the USER 100 is unsuccessful. If the USER 100 is authenticated, the SP creates a folder 209 containing the next Call 210 and authentication message 211 for the USER 100. The folder 209 is encrypted using the Password 106. When the authentication message 211 is communicated to the USER 100, the SP encrypts the folder 209 using the Password 106 and further limits access to the folder 209 to the USER 100 contacting the SP from the recorded IP Address 102. Then, the folder 209 is sent to the USER.

In step (U3), the USER 100 opens and decrypts the folder 209, retrieves the next Call 210, and authentication message 211 prior to proceeding to the next step.

In step (U4), the USER creates a folder 109 containing a Password 110 for the Call 210 and the ICT message M. Then, the folder 109 is encrypted using the Call 210. The encrypted folder 109 may only be accessed by the SP from the SP's recorded IP Address 202. Next, the folder 109 is sent to the SP.

In step (S3), the SP opens and decrypts the folder 109, verifies the provided Password 110, checks the ICT message 111 contents for acceptability, and creates a folder 212 containing the next Call 213 and the SP's ICT message 214. Then, the folder 212 is encrypted using the Password 110. Access to the folder 212 is restricted to the IP Address 102 of the USER 100 that provided the Password 110. Next, the folder 212 is transmitted to the USER 100.

In step (U5), the USER 100 opens and decrypts the folder 212, checks the ICT message 214 contents for acceptability. If required by the USER to continue, proceed back to step U4. The SP is notified if the USER 100 does not desire to continue the session and the USER 100 exits the transaction.

In step (S4), the SP ends the transaction when notified by the USER 100, after a lapse of a specified time, receipt of incorrect Passwords, and/or if unable to decrypt a transmission.

The steps U4, S3, U5 are repeated for every transaction, with subsequent folders, Passwords, Calls, and ICT messages being created as required.

The above method uses one Password, furnished by the USER, per transaction. This method is independent of external security systems used to secure transactions. Objects exchanged during a session are secured by Calls and/or Passwords generated by the BIGVIP system. Two way authentication of and access restriction to objects/messages exchanged during a session ensures continuity of the link between a SERVICE PROVIDER and the USER from the beginning until the end of the session. The USER and the SERVICE PROVIDES may use software programs designed to implement this method.

An example stock market transaction requiring individual authentication of each transaction appears below:

In this example, USER1 is a client and SP1 is a stockbroker. VCS 4 is the pre-agreed to VCS. The initial dialogue prior to commencement of the transactions is SP1: Please furnish USER name

USER: USER1

SP1 verifies USER1, if available, records IP address of USER1

USER1: 24, 53 (Call made over an open network)

SP1, checks whether the Call is correct. If the Call is correct, SP1 creates a folder containing the Password "IAGNTN", makes a Call: 43, 36 and generates a message for USER1, SP1 encrypts and restrict access to the folder using the Password "IAGNTN" and sends the folder to USER1.

USER1 receives the folder from SP1 opens and decrypts the folder using the Password "IAGNTN" verifies Password is "IAGNTN" and gets the Call of SP1.

USER1 creates a folder containing the Password "RNNSWH" in response to SP1's Call, a message, encrypts and access restricts the folder using the Call "4336" and sends the folder to SP1.

SP1 opens and decrypts the folder received from USER1, using the Call "4336", checks the Password "RNNSWH" furnished by USER1, finding it correct, issues a welcome message. Next, SP1 issues a Call: 2, 67, encrypts and access restricts a folder using Password. "RNNSWH", and sends the folder to USER1.

When the USER1 has created a first order (e.g., sale1), a folder containing sale (and the Password "DWPP" is created. The folder is encrypted and access thereto restricted to the Call: "267" prior to being sent to SP1.

SP1 receives, opens, and decrypts the folder using the Call "267", verifies the Password entered in response to the Call "267" and the first order "sale1" for compliance of rules and then dispatches it to the stock exchange. Then, SP1 creates a folder containing an acknowledgement message, a Call "56, 22", and encrypts and access restricts the folder using the Password "DWPP" prior to sending the folder to USER1.

USER1 receives, opens, and decrypts the folder using the Password "DWPP", verifies the acknowledgement message, notes the next Call "5622", and proceeds with the next order transaction if required. If not required, notifies SP1 of intent to terminate the session and exits.

Figure 2:
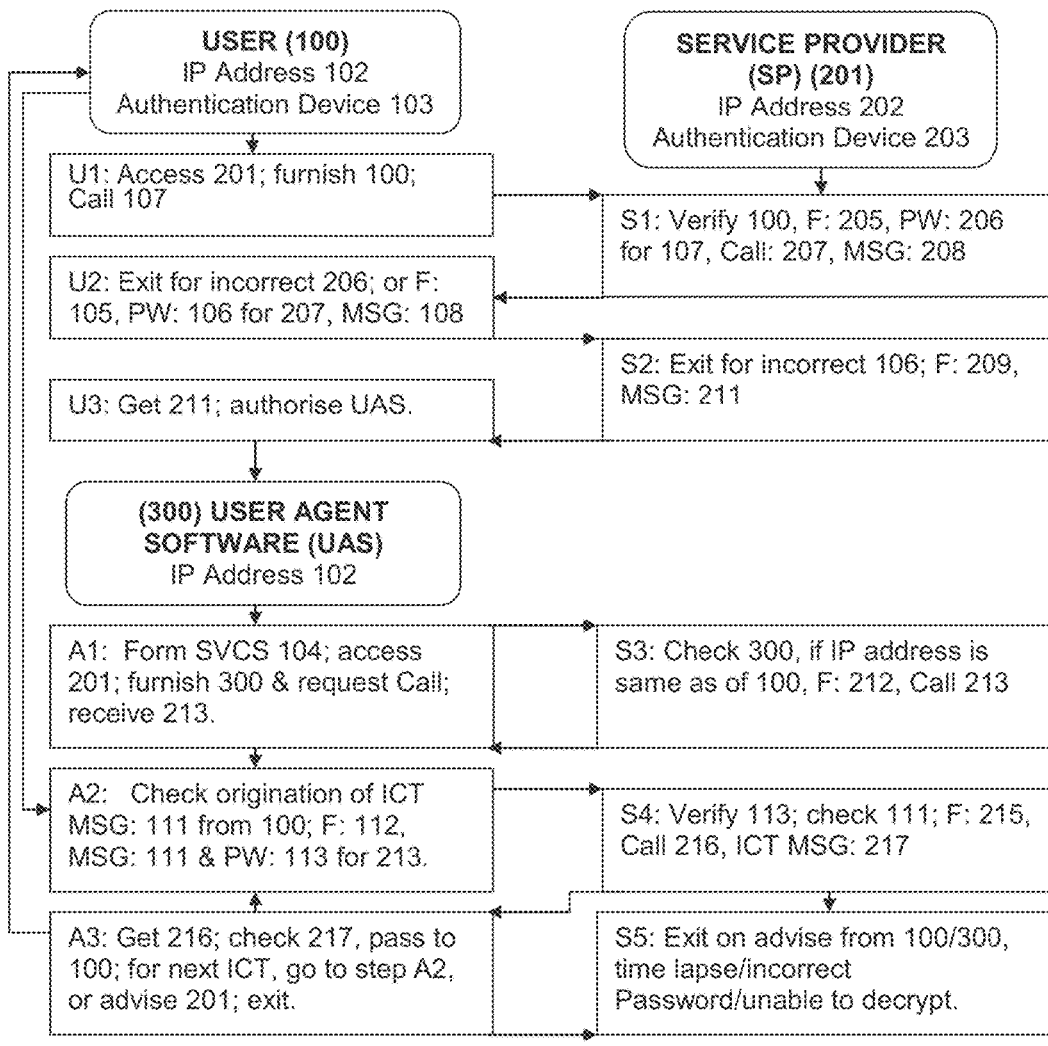
FIG. 2 illustrates a flow chart of a method of authenticating and securing every individual Internet Contract/Network transaction by generating many Passwords from a single Password furnished by a USER.

A Method of Authenticating and Securing Every Individual Internet Contract/Network Transaction by generating many Passwords from a single Password furnished by a USER: FIG. 2 illustrates a flow chart of this method. In this, a USER 100 having an USER account with a SERVICE PROVIDER (SP) having a website 201 for transacting with the USER 100. The transaction between a USER 100 and the SP's website 201 are facilitated by USER Agent Software (UAS) 300 as illustrated.

The steps U1, S1 and U2 are the same as in the method of authentication and securing each individual ICT/Network transaction of a USER using one Password furnished by a USER for each transaction. The step S2 is also the same as described above except that the Call 210 is not sent to the USER. These steps are not repeated here.

In step (U3), the USER opens and decrypts the folder 209. If authentication is successful, the USER authorizes the USER Agent Software (UAS) to act further.

In step (A1), the UAS 300 collects the Call 207 and the Password 106 and creates an authentication device 104 for the session using the Password 106 as the Character Units and the Call 207 as CU serial numbers (SNCU). In some implementations, the UAS 300 could assign different CU serial numbers and communicate them to the SP using the Password to encrypt and restrict access thereto. Then, the UAS 300 accesses the website 201, records the SP's IP Address 202, furnishes the USER Name of the UAS 300, and requests a Call. After the SP responds, the UAS 300 receives, opens, and decrypts the folder 212 and retrieves the Call 213.

In step (S3), the SP checks to see if the IP address of the UAS 300 is the same as the USER's 100 if Address 102. If the IP Addresses 102 are the same, the SP creates a folder 212 containing a Call 213 using the authentication device 104 and encrypts the folder 212 using the Password 106. Then, the SP restricts access to the folder 212 to the UAS 300 accessing the SP's system from the IP Address 102 of the USER 100 and to a USER able to input the correct Password 106. Next, the folder 212 is transmitted to the UAS 300.

In step (A2), the UAS 300 receives an ICT message 111 from the USER. Then, the UAS 300 checks the origin of the message 111 to verify that it is from the USER 100 by checking the continuity of the connection with the SP, the integrity of the command to initiate the transaction, and by checking keyboard and other input entries. Next, the UAS 300 creates a folder 112 containing an ICT message 111 and a Password 113 for the Call 213. Then, the folder 112 is encrypted using the Call 213 as a Password. The folder 112 may only be accessed from the SP's 201 IP Address 202. Next, the folder 112 is then sent to the SP.

In step (S4), the SP opens and decrypts the folder 112, verifies the Password 113, and checks the contents of the ICT message 111 for acceptability. Then, the SP creates a folder 215 containing the next Call 216 and the SP's ICT message 217. The folder 215 is encrypted using the Password 113 and access is restricted to the UAS 300 accessing the SP's system from the IP Address 102 of the USER 100. Next, the folder 215 is transmitted to the UAS 300.

In step (A3), the UAS 300 opens and decrypts the folder 215, gets the Call 216, checks the content of the ICT message 217 for acceptability, and passes the ICT message 217 to the USER 100. If required to continue the session by the USER, proceed to step A2. If the USER 100 does not desire to continue the session the SP is notified and the USER 100 exits the transaction.

In step (S5), the SP exits when notified by the USER 100, after a lapse of a specified time, receipt of incorrect Passwords (e.g., three incorrect Passwords), and/or if unable to decrypt a transmission.

The steps A2, S4, A3 are repeated for every transaction, with subsequent folders, Passwords, Calls, and ICT messages being created as required.

In general, the interactions between the USER Agent Software and the SERVICE PROVIDER takes place without additional efforts from the USER. One exception to this is when authentication fails. When authentication fails, the USER is notified so that the USER may take corrective action. Since a SVCS/SVCS L2 is generated from the USER's VCS/SVCS, it is possible for the USER to complete an individual authentication request if the USER has noted down the initial Call of random CU serial numbers and the Password. When necessary, a USER may at any time interrupt the USER Agent Software. A party other than an authorized USER attempting to create an ICT would not have access to SVCS/SVCS L2 applicable for that session. Any other person/object could not initiate an ICT from another computer using the USER name of USER1, because access to the transaction is restricted to the USER's address. Even if a third party user attempts to originate an ICT through the USER's computer by remote commands, the keyboard entries and USER's commands will differ and the USER Agent Software will reject the ICT. In this way, only authenticated ICTs are sent to the SERVICE PROVIDER and/or to the USER. Every ICT is authenticated with a Password entered by the USER or the USER Agent Software. This ensures that access to the file or data packet containing an ICT exchanged between a USER and a SERVICE PROVIDER is restricted to the recipient SERVICE PROVIDER and/or USER. Using the USER Agent Software, the USER is authenticated once and his future actions are authenticated using the same Password without the need for further input from the USER. While further input may not be needed to authenticate transactions occurring subsequent to the initial transaction, the USER will have the option to manually authenticate each transaction or, at any time, interrupt the USER Agent Software. With the present method, an exact link between the USER and actions of the USER is established. In this way, ICTs are clearly associated with the USER who initiated them and to the computer were the Password was entered. This may be of use when attempting to solve ET related claims. All actions of a USER are traceable to a USER from the moment the USER accesses the Internet through an Internet Service Provider. This tracking ability of the SERVICE PROVIDER may be of immense value during times when a computer is being used without the consent of the owner.

This method is characterized by several features. First, the use of the USER Agent Software to generate many variable Passwords from one initial Password furnished by the USER at the beginning of a session. Second, the authentication and securing of transactions between two parties (e.g., the USER and the SERVICE PROVIDER) through the use of two computationally non-intensive encryption keys (i.e., a Call and Password). In this instance, the encryption keys used for each Internet/network transactions are linked to the USER'S identity. Third, two way authentication and access restriction of objects and/or messages exchanged between the parties is facilitated by using two different Passwords/encryption keys for each transaction. Fourth, ensuring the continuity of the network link between a SERVICE PROVIDER and a USER from the beginning until the end of a session. Fifth, providing proof regarding the origin of every Internet/network transactions initiated by the USER. Sixth, providing a way of tracing all actions of the USER that occur between the beginning and end of a session. In this way, claims related to the Internet/network transactions may be solved. Seventh, a method of authentication that is independent of any external security system used for the transactions. Both the USER and the SERVICE PROVIDER use software programs designed to implement the method.

An example of individual email authentication using the above described method of authenticating and securing every individual Internet Contract/Network transaction b generating many Passwords from a single Password furnished by a USER appears below:

USER1 is the USER, SP1 is the email server, and UAS is the email software Which functions as USER1's agent, VCS1 (see, Table I) is the pre-agreed to VCS. Initially, USER1 opened the website of SP1 thereby indicating his desire to have email transactions with SP1.

SP1: Please enter your USER name

USER1: USER1

SP1, verifies USER1 and, if available, records the IP address of USER1

USER1: 73, 41, 100, 9 (Call over open network)

SP1, checks whether the Call is correct. If the Call is correct, SP1 creates a folder containing the Password: "IImzdjGd". Call: "56, 2, 33, 87", and a message to the USER1. The folder is encrypted and access thereto restricted by using the Password "IImzdjGd" prior to being sent to USER1.

USER1 receives the folder from SP1 opens the folder by furnishing the Password "IImzdjGd", decrypts the folder using is "IImzdjGd", and gets SP1's Call.

USER1 then creates a new folder containing the Password "2j1D96OG" appropriate to SP1's Call and a message. Next, the folder is encrypted and access thereto restricted using the Call "5623387" prior to being transmitted to SP1.

SP1 opens and decrypts the folder received from USER 1, using the Call "5623387" to check the Password furnished by USER1. Finding the Password to be correct, SP1 welcomes USER1 (Welcome implies that USER is authenticated).

USER1 authorizes the UAS and passes on the Call "56, 2, 33, 87" and Password "211D96OG" thereto.

UAS forms a SVCS as shown below. Then, the UAS accesses SP1, furnishes the USER Name, and seeks a Call.

| SNCU | 56 | 2 | 33 | 87 |
| CU | 2j | 1D | 96 | OG |

SP1 then checks the IP address of the UAS. If the IP Address of the UAS is the same as that of USER1, SP1 creates a folder containing a Call "56, 87, 33". The folder is encrypted and access thereto restricted using Password "2j1D96OG". Then, the folder is transmitted to the UAS.

The UAS receives, opens, and decrypts the folder using Password "2j1D96OG", gets the Call "56, 87, 33", and awaits the ICT from USER1.

When USER1 has created a first email (e.g., email1), it is passed on to the UAS. The UAS checks to see if USER1 is logged into the account and if the commands match the content of email1. Then, the UAS creates a folder containing email1 and Password "2jOG96". This folder is encrypted and access thereto restricted using the Call "568733". Then, the folder is transmitted to SP1.

SP1 receives, opens, and decrypts the folder using the Call "568733". SP1 then verifies the Password "2JOG96" and email1 for compliance with any rules prior to dispatching email1 to the appropriate email address. Next, SP1 creates a folder containing an acknowledgement message and the next Call "56, 87". The folder is encrypted and access thereto restricted using Password "2jOG96". Then, the folder is transmitted to the UAS.

The UAS, receives, opens, and decrypts the folder using Password "2jOG96". Also, the UAS verifies the content of the message for acceptability prior to passing the message on to the USER. The UAS retains the Call for use with subsequent emails using, for example, the following Calls and Passwords as they appear below:

| | |
|---|---|
| Email2, Call: 56, 87 | Password: 2jOG |
| Email3, Call: 87, 56, 2, 33 | Password: OG2j1D96 |
| Email4, Call: 56, 33, 2 | Password: 2j961D, etc. |

Figure 3:
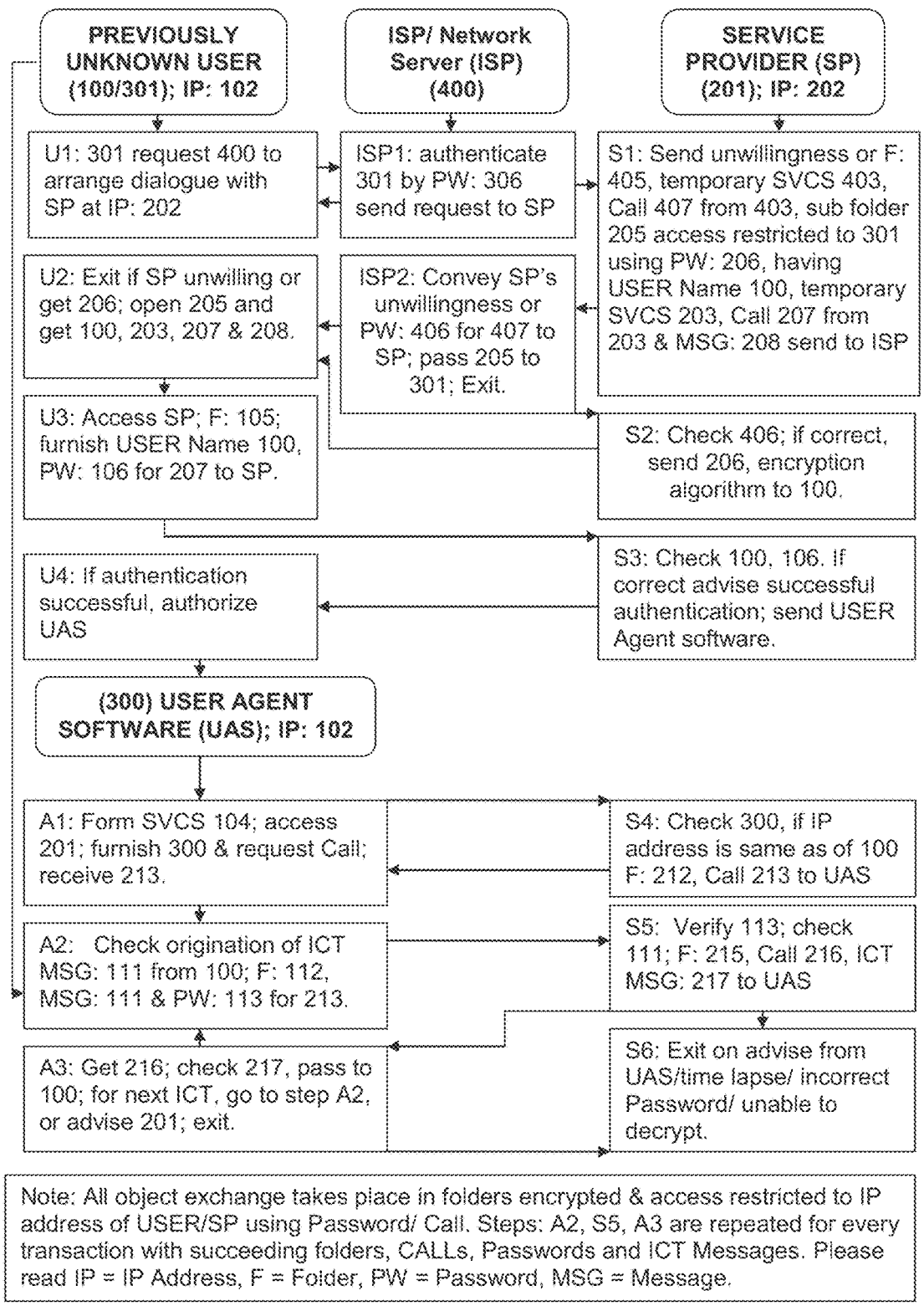
FIG. 3 illustrates a method of authenticating and securing every individual Internet/Network transaction of a previously unknown USER by generating many Passwords from one Password furnished by the previously unknown USER.

A method of authenticating and securing every individual Internet/Network transaction of a previously unknown USER by generating many Passwords from one Password: FIG. 3 illustrates a flow chart of this method. In this method, a previously unknown USER 100/301 having an USER account with an Internet Service Provider/Network Server (ISP) 400 is authenticated to a SERVICE PROVIDER having a website 201. The authentication of the previously unknown USER 100/301 is done through the ISP 400 and the transactions are facilitated through the UAS 300 as illustrated.

In step (U1), a previously unknown USER 301 with an IP address 102 and a USER Name 301 registered with an ISP 400 requests that the ISP 400 arrange for dialogue with the SP and provides the IP Address 202 of the SP.

In step (ISP1), the ISP 400 authenticates the USER 301 using a Password 306 known to and exchanged between the USER 301 and the ISP 400. Then, the USER's 301 request is forwarded to the SP's website 201 along with the previously unknown USER's 301 details.

In step (S1), the SP considers the request. If the SP is unwilling to transact with the previously unknown USER 301 the ISP 400 is notified of this. If the SP is willing to transact with the previously unknown USER 301, a folder 405 containing a temporary SVCS 403 is created for the ISP 400. Then, a Call 407 from the SVCS 403 is generated, and a sub-folder 205 created within the folder 405 that contains a USER Name 100, the temporary SVCS 203 for the USER, a Call 207 from the SVCS 203, and a message 208. The sub folder 205 is encrypted with a Password 206 that is transmitted later. Access to the subfolder 205 is restricted to a USER that is located at the correct IP Address 102 who is also able to provide the correct Password 206. Next, the folder 405 is transmitted to the ISP 400.

In step (ISP2), the ISP 400 conveys the SP's unwillingness to USER if such was conveyed by the SP to the ISP 400. If the folder 405 is received from the SP, the folder 405 is opened, the Password 406 for the Call 407 entered, and the sub-folder 205 passed to the USER 301. Then, the ISP 400 exits after sending the sub-folder 205 to the previously unknown USER 301.

In step (S2), the SP verifies the Password 406 received from the ISP 400. If the Password 406 is correct, the SP sends the Password 206 directly to the previously unknown USER 301 along with the encryption algorithm.

In step (U2), the previously unknown USER 304 exits if the SP is unwilling to transact with the USER 301. If the SP is willing to transact with the USER 301, the USER 301 receives the Password 206 and encryption algorithm. The Password 206 and encryption algorithm are used by the USER 301 to open the sub folder 205 and thereby retrieve a USER name 100, authentication device 203, Call 207, and Message 208.

In step (U3), the previously unknown USER 301 accesses the SP's website 201, records the IP address 202 of the SP, and furnishes the USER Name 100 thereto. Then, the USER 301 creates a folder 105 containing the Password 106 for the Call 207 made by the SP. The folder 105 is encrypted using the Call 207 and access thereto is restricted to the SP located at the IP address 202 who is able to provide the Call 207. In this instance, the Call 207 acts as the Password. Then, the folder 105 is sent to the SP.

In step (S3), the SP verifies the USER name 100 and records the IP address 102 of the previously unknown USER 301. Then, the SP locates the authentication device 203, opens and decrypts the folder 105, and verifies the Password 106. If the Password is correct, the previously unknown USER 301 is notified that they have been successfully authenticated. From this point on, the previously unknown USER 301 becomes an authenticated temporary USER to the SP. Next, the SP may send the USER 301 USER Agent Software on request. If authentication fails after three chances, the SP exits.

In step (U4), if authentication was successful, the USER 100/301 authorizes the UAS 300 to act further.

The steps that follow (A1), (S4), (A2), (S5), (A3) and (S6) are similar to steps (A1), (S3), (A2), (S4), (A3) and (S5) of the method of authenticating and securing every individual Internet Contract/Network transaction by generating many Passwords from a single Password furnished by a USER. Other than the initial steps associated with the authentication of a previously unknown USER, this method has similar characteristics and features as described in connection with the previous method and hence are not repeated here.

An example transaction initiated by a previously unknown USER participating in an auction is given below.

PUUSER wants to participate in the auction conducted by SP1. PUUSER is not registered with SP1. PUUSER has account with ISP1.

PUUSER requests ISP1 to arrange a dialogue with SP1. Then, ISP1 authenticates PUUSER with a Password and passes on the request to SP1.

SP1 is using a MVCS 1 as the authentication device. Initially, SP1 sends a SVCS entitled "SVCSr" with CU serial numbers (SNCUs) 1 to 8 and a Call "7, 4, 1" meant for ISP1. Also, SP1 sends a SVCS entitled "SVCSn" with CU serial numbers (5NCUs) 161 to 169 and a Call "167, 169, 164, 166" to PUUSER. SP1 restrict access to the folder containing SVCSn, the Call, and the Message by only allowing PUUSER to access the folder from PUUSER's IP Address while using the Password "PN3CRA". Then, the folder is transmitted to ISP1.

| 1 | 2 | 3 | 4 | 5 | 6 | 7 | 8 |
|---|---|---|---|---|---|---|---|
| 6C | FP | XK | CT | 8O | RW | P4 | 4T |

SVCSr

| 161 | 162 | 163 | 164 | 165 | 166 | 167 | 168 | 169 |
|---|---|---|---|---|---|---|---|---|
| MI | DO | P4 | S1 | 7K | DZ | DD | 81 | HN |

SVCSn

ISP1 furnishes the Password "P4CT6C" in response to the Call made by SP1 and transmits the folder containing the SVCS entitled "SVCSn" to PUUSER.

SP1 after verifying the Password received from ISP1 sends PUUSER the Password "PN3CRA" to open the folder.

PUUSER's opens the folder using the Password "PN3CRA", retrieves SVCSn, and the Call "167, 169, 164, 166". Then, the PUUSER furnishes the Password "DDHNS1DZ" to SP1. Next, SP1 validates the Password and agrees to transact with PUUSER.

Then, PUUSER gets UAS and authorizes UAS to act.

Next, the UAS forms SVCSL2 as shown below and seeks a Call.

| 167 | 169 | 164 | 166 |
| --- | --- | --- | --- |
| DD | HN | S1 | DZ |

SP1 then issues a Call "166, 164, 167" and encrypts using the Password "DDHNS1DZ".

The UAS opens and decrypts the folder received from SP1 using the Password "DDHNS1DZ" and retrieves the Call.

PUUSER participates in the auction, witnesses bids in progress, makes the first bid (e.g., bid1), and passes it to the UAS. The UAS verifies the origin of the message and creates a folder containing bid1 and the Password "DZS1DD". The folder is encrypted and access thereto is restricted through the use of IP address verification and a Call "166164167" which acts as a Password. Then, the folder is sent to SP1.

SP1 receives, opens, and decrypts the folder. Then, SP1 checks the Password and, if correct, accepts bid1. Next, SP1 sends an acknowledgement and the next Call in a folder encrypted and access restricted by the Password "DZS1DD". The folder is then transmitted to the UAS.

The UAS receives, opens, and decrypts the folder received from SP1. Then, SP1 checks the contents of the folder. If everything in the folder is correct the folder is passed to the PUUSER. The UAS retains the Call contained in the folder. Next, the UAS awaits further instruction (e.g., additional bids) from the PUUSER.

As an example, two future bids could rely on the following Calls and Passwords:

| Bid2, Call: 164, 169 | Password: S1HN |
| --- | --- |
| Bid3, Call: 166, 169, 167 | Password: DZHNDD, etc. |

Authenticated Dialogue Initiation: The BIGVIP system may use Authenticated Dialogue Initiation as a Call initiation method. Authenticated Dialogue Initiation may take place over the Internet between a USER and another party (or secondary party) who may be known or unknown to the USER. In instances were Authenticated Dialogue Initiation is used as the Call initiation method, a VCS with a large number of CUs is used. The VCS may be made public or made available on a public server. Only BIGVIPs are used with Authenticated Dialogue Initiation.

When a USER wants to initiate a dialogue with another party, initially the USER initiates a Call requesting a Password generated from the VCS defined for Authenticated Dialogue Initiation purposes from the other party along with their IP Address. Next, the other party furnishes the Password using the publically available VCS to construct the correct Password and transmits their IP Address. Then, the USER checks the IP address of the other party and the Password. If both the IP Address and the Password are correct the other party is admitted to the transaction initiated by the USER. In this way, parties Called by a USER using the Authenticated Dialogue Initiation method are granted preferred access and parties unable to provide the correct Password and IP Address in reply to the Call are denied access or granted non-preferred access. Non-preferred access implies that the USER is restricting access to a portion of the USER's system designated by the USER.

The Authenticated Dialogue Initiation method is a simple and effective way of controlling initial access to the USER's system or transaction similar to admitting guest to a function using invitations. This method is computationally non-intensive.

Example: MVCS1 (shown on Table V below) is the VCS published for Authenticated Dialogue Initiation purpose. USERX initiates a Call to SPX at domain name "www.yespee_ex.com". Using a web browser, USERX keys in the address:

"www.yespee_ex.com". In a space (or prompt) provided in the web browser for confirmation of the domain accessed by USERX, USERX initiates a Call using CU serial numbers "31, 298, 174". Then, SPX on receipt of the Call, if willing to have dialogue with USERX, selects the correct CUs of the Password from MVCS 1 using the CU serial numbers provided during the call and replies with the correct Password "KYUPLN" and connects back to USERX. USERX verifies the provided Password "KYUPLN" as being correct and opens (or allows access to) the website. Alternatively, USERX may optionally block the web site if the Password is incorrect or not furnished.

Automatic Classification of USERS upon access: A USER wanting to access a restricted sub domain may have to take several actions to do so. Initially, the USER will have to gain access to the main domain of the SERVICE PROVIDER's system. Then, the USER may have to provide further identifying information in reply to queries from the SERVICE PROVIDER's system. These queries are used to establish what user group the USER may belong to and thereby what specific sub-domain(s) of the SERVICE PROVIDER's system the USER may access. Next, the SERVICE PROVIDER evaluates the responses provider by the USER to the queries and determines the USER's eligibility to access one or more specific sub-domains of the system. Finally, the SERVICE PROVIDER either allows or disallows a USER to access one or more specific sub-domains of their system.

In some implementations, a MVCS and a SVCS arrangement of the BIGVIP system may be used to classify a USER upon accessing a SERVICE PROVIDER's system. In some implementations, the identification of the SVCS being used is called for a part of the Password. In some implementations, the Password alone may be used to identify Password subgroups and thereby provide for the classification of a USER upon gaining access to a SERVICE PROVIDER's system. In this way, a USER may be classified without providing further identifying information or the need for the SERVICE PROVIDER's system to access previously stored information. This may be used to facilitate a SERVICE PROVIDER's decisions on the admissibility of a USER to one or more specific sub-domains within a main domain. Post access routing of the USER is decided and effected without further independent checks. In other words, upon gaining access to a SERVICE PROVIDER's system, classification and routing of the USER is done in one step. This reduces one or more stages of communication and therefore confers the substantial advantage of reducing communication costs (Internet as well as other communications).

As an Example: A software company may have one or more customers who purchased various software products. The software company only provides updates for their software products over the Internet to USERS who have purchased a particular software product(s). In existing Password systems, the customer may have to access the software companies' Home/main page, enter a user name and password, go to a specific page or follow a provided link related to the software update, furnish details regarding the purchase and/or registration information for the software, locate the update, and then retrieve the update. In this process, multiple stages of communication (i.e. the user going to a specific page/provided link related to the software update, furnishing details regarding the purchase and/or registration information for the software, locating the update, and the company verifying the purchase and/or registration data) are involved in the decision to allow and/or disallow a user to update their software.

Using the BIGVIP system the task of verifying if a user purchased one or more software products may be simplified. All buyers of a particular software product may be assigned a SVCS having a partially common SVCS identifier (e.g., the last two characters of a Password are AA). Initially, the customer (USER) has to go to the software companies Home/main page, enter their USER name and a Password, and seek the specific update associated with the one or more purchased software products (from the main page itself). Using the BIGVIP system, the software company only has to verify the USER's name, Password, whether the last two characters of the Password are AA (in this example), and directly allow the USER access to the specific software update.

INDUSTRIAL APPLICABILITY

The BIGVIP system may be useable by anyone or any device having a data processor for the purpose of authenticating use thereby and/or access thereto. The BIGVIP system provides for a level of security that may be higher than what is provided for by present password systems and/or Biometric Authentication. Further, by using a MVCS and SVCS of the BIGVIP system one or more stages of communication and/or the cost of communication may be reduced.

Reference throughout this specification to "an embodiment" or "implementation" or words of similar import means that a particular described feature, structure, or characteristic is included in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in be foregoing descriptions and the associated drawings.

The described features, structures, or characteristics may be combined any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations are depicted in the drawings in a particular order, this should not be understood as requiring that such operations be performed in the particular order shown or in sequential order, or that all illustrated operations be performed, to achieve desirable results.

TABLE I

For VCS 1 to VCS 5, Character Unit serial numbers (SNCU) should be reckoned as column number × 10 + row number. For VCS 6, it is – row number × 10 + column number. Column numbers are indicated in top row and row numbers are indicated in the leftmost column.

| VCS 1 | | | | | | | | | | | VCS 2 | | | | | | | | |
| --- | --- | --- | --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | | 0 | 1 | 2 | 3 | 4 | 5 | 6 | 7 |
| 1 | pF | IO | Bu | Im | mZ | cl | KQ | Fm | $C | ae | 1 | 69 | 868 | 15 | 386 | 536 | 195 | 465 | 506 |
| 2 | 1D | f9 | Vr | sN | OU | xP | JL | 2u | aO | AC | 2 | 291 | 61 | 129 | 818 | 104 | 799 | 822 | 511 |
| 3 | $h | yy | IZ | 96 | rA | Sr | qG | II | 0U | LC | 3 | 559 | 219 | 374 | 982 | 638 | 384 | 135 | 308 |
| 4 | za | 2r | Em | Ov | NV | r@ | eF | $q | It | 1x | 4 | 62 | 429 | 224 | 269 | 526 | 340 | 878 | 527 |
| 5 | Xn | DP | Kn | Hy | pn | cE | OK | OS | cl | 1p | 5 | 430 | 823 | 991 | 988 | 916 | 711 | 105 | 973 |
| 6 | Jf | 0N | 1z | 3P | kG | 2j | QO | 7s | pK | b1 | 6 | 974 | 317 | 498 | 472 | 228 | 542 | 987 | 669 |
| 7 | bw | 6Y | lm | vW | GW | qX | wW | vn | OG | V9 | 7 | 383 | 504 | 900 | 155 | 420 | 705 | 365 | 910 |
| 8 | CO | ce | tM | ok | a1 | DX | KM | zL | 60 | Tm | 8 | 967 | 188 | 552 | 463 | 992 | 893 | 488 | 153 |
| 9 | Gd | zS | wl | 1u | $E | La | zF | UI | gl | PI | 9 | 811 | 81 | 652 | 329 | 63 | 821 | 323 | 666 |
| 10 | y5 | ze | aY | CU | b1 | tM | @x | Qa | l1 | dj | 10 | 688 | 7 | 617 | 386 | 313 | 5 | 172 | 924 |

| VCS 3 | | | | | | | | | | | | | | | | VCS 4 | | | | | | | |
| --- | --- | --- | --- | --- | --- | --- | --- | --- | --- | --- | --- | --- | --- | --- | --- | --- | --- | --- | --- | --- | --- | --- | --- |
| | 0 | 1 | 2 | 3 | 4 | 5 | 6 | 7 | 8 | 9 | 10 | 11 | 12 | 13 | 14 | | 0 | 1 | 2 | 3 | 4 | 5 | 6 | 7 |
| 1 | 2 | B | S | n | h | A | 7 | c | Q | 1 | S | y | q | G | S | 1 | DPF | TBZ | KXK | BNR | QBX | EFQ | HGS | IGO |
| 2 | D | 4 | j | u | U | 1 | 4 | 8 | b | c | H | 1 | d | A | V | 2 | D | AKK | HMH | YLG | QUZ | OHS | GHT | JMS |
| 3 | Y | w | I | L | n | x | C | B | 6 | E | @ | P | z | m | A | 3 | GNO | XGD | ET | PBA | RNN | NTN | CXK | HFL |
| 4 | F | m | Z | q | o | 9 | 5 | d | h | 3 | E | J | 8 | B | F | 4 | GFX | FKA | IAG | CIE | QGU | LJB | BJD | PHC |
| 5 | o | f | v | g | x | u | f | 0 | E | m | E | x | 9 | z | D | 5 | YSI | QQ | OBZ | XRH | UJM | AIS | SVG | TUQ |
| 6 | 5 | c | l | y | 6 | 4 | $ | n | B | f | G | O | 0 | U | A | 6 | NKA | AXP | DOQ | SWH | A | DLL | RTH | BEQ |
| 7 | B | A | R | q | 4 | h | P | h | P | k | K | e | n | 9 | L | 7 | YDY | NMU | PFJ | KSU | TDX | STD | WPP | JY |
| 8 | I | I | f | g | 5 | G | R | P | b | G | L | A | s | R | O | 8 | JJY | ML | GVQ | HYP | PFN | AMB | BVC | NVN |
| 9 | E | 9 | b | 9 | 3 | C | m | 4 | 9 | d | T | P | m | V | A | 9 | OSW | FJD | MKL | LMQ | TBO | LDF | VCL | BGJ |
| 10 | 6 | 5 | T | j | o | T | 6 | Q | 2 | 6 | X | L | X | H | Q | 10 | VHU | XJT | JUO | GEO | XET | EQ | CQL | RXC |

| VCS Details | | | |
| --- | --- | --- | --- |
| VCS No. | Basic Characters used | No. of Basic Characters per Character Units | No. of Character Units |
| 1 | 64; A-Z, a-z, 0-9, @, $ | 2 | 100 |
| 2 | 10; 0-9 | 1-3 | 80 |
| 3 | 64; A-Z, a-z, 0-9, @, $ | 1 | 150 |
| 4 | 26; A-Z | 1-3 | 80 |

TABLE IV-A

| Sl. No. 1 | Sl. No. of VCS 2 | Basic Characters used 3 | Number of Basic Characters used 4 | Number of Basic Characters forming a Character Unit 5 | Total Number of Character Units in Variable Character Set 6 | Number of Character Units in Password 7 | Number of possible Character Units 8 C4^C5 | Number of possible Passwords using all Character Units in Variable Character Set 9 C6^C7 |
|---|---|---|---|---|---|---|---|---|
| 1 | 1 | A-Z, a-z, 0-9, @, $ | 64 | 2 | 100 | 2 | 4096 | 1.00E+04 |
| 2 |   |   | 64 | 2 | 100 | 3 | 4096 | 1.00E+06 |
| 3 |   |   | 64 | 2 | 100 | 4 | 4096 | 1.00E+08 |
| 4 | 2 | 0-9 | 10 | 3 | 80 | 3 | 1000 | 5.12E+05 |
| 5 |   |   | 10 | 3 | 80 | 4 | 1000 | 4.10E+07 |
| 6 | 3 | A-Z, a-z, 0-9, @, $ | 64 | 1 | 150 | 4 | 64 | 5.06E+08 |
| 7 |   |   | 64 | 1 | 150 | 5 | 64 | 7.59E+10 |
| 8 |   |   | 64 | 1 | 150 | 6 | 64 | 1.14E+13 |
| 9 |   |   | 64 | 1 | 150 | 7 | 64 | 1.71E+15 |
| 10 |   |   | 64 | 1 | 150 | 8 | 64 | 2.56E+17 |

| Sl. No. 1 | Number of Unique Passwords using all Basic Characters 10 C4^(C5*C7) | Chance of 3 Random Trials on Character Units (1 in X) 11 C10/3 | Password Safety Index (BIGVIP) 12 log(C11)/log(2) | Number of Non Repeating Character Units in Password 13 | Number of possible Passwords with Non Repeating Characters 14 C6/C13 | Chance of 3 Random Trials on Non Repeating Characters (1 in X) 15 C4^(C5*C13)/3 | Password Safety Index (NRBIGVIP) 16 log(C15)/log(2) | Number of possible VCSs 17 (C8)P(C6) |
|---|---|---|---|---|---|---|---|---|
| 1 | 1.68E+07 | 5.59E+06 | 22 | 2 | 50 | 5.59E+06 | 22 | VLN |
| 2 | 6.87E+10 | 2.29E+10 | 34 | 2 | 50 | 5.59E+06 | 22 | VLN |
| 3 | 2.81E+14 | 9.38E+13 | 46 | 3 | 33 | 2.29E+10 | 34 | VLN |
| 4 | 1.00E+09 | 3.33E+08 | 28 | 2 | 40 | 3.33E+05 | 18 | 4 E+238 |
| 5 | 1.00E+12 | 3.33E+11 | 38 | 3 | 26 | 3.33E+08 | 28 | 4 E+238 |
| 6 | 1.68E+07 | 5.59E+06 | 22 | 3 | 50 | 8.74E+04 | 16 | VLN |
| 7 | 1.07E+09 | 3.58E+08 | 28 | 4 | 37 | 5.59E+06 | 22 | VLN |
| 8 | 6.87E+10 | 2.29E+10 | 34 | 5 | 30 | 3.58E+08 | 28 | VLN |
| 9 | 4.40E+12 | 1.47E+12 | 40 | 6 | 25 | 2.29E+10 | 34 | VLN |
| 10 | 2.81E+14 | 9.38E+13 | 46 | 7 | 21 | 1.47E+12 | 40 | VLN |

TABLE IV-B

| Sl. No. 1 | Sl. No. of VCS 2 | Basic Characters used 3 | Number of Basic Characters used 4 | Number of Basic Characters forming a Character Unit 5 | Total Number of Character Units in Variable Character Set 6 | Number of Character Units in Password 7 | Number of possible Character Units 8 C4^C5 | Number of possible Passwords using all Character Units in Variable Character Set 9 C6^C7 |
|---|---|---|---|---|---|---|---|---|
| 11 | 4 | A-Z | 26 | 3 | 80 | 2 | 17576 | 6.40E+03 |
| 12 |   |   | 26 | 3 | 80 | 3 | 17576 | 5.12E+05 |
| 13 |   |   | 26 | 3 | 80 | 4 | 17576 | 4.10E+07 |
| 14 | 5 | As in VCS 5 | 512000 | 2 | 100 | 2 | 2.62E+11 | 1.00E+04 |
| 15 |   |   | 512000 | 2 | 100 | 3 | 2.62E+11 | 1.00E+06 |
| 16 |   |   | 512000 | 2 | 100 | 4 | 2.62E+11 | 1.00E+08 |
| 17 |   |   | 512000 | 2 | 100 | 5 | 2.62E+11 | 1.00E+10 |
| 18 |   |   | 512000 | 2 | 100 | 6 | 2.62E+11 | 1.00E+12 |
| 19 | 6 | As in VCS 6 | 536400 | 2 | 150 | 3 | 2.88E+11 | 3.38E+06 |
| 20 |   |   | 536400 | 2 | 150 | 4 | 2.88E+11 | 5.06E+08 |

TABLE IV-B-continued

| Sl. No. 1 | Number of Unique Passwords using all Basic Characters 10 $C4\hat{}(C5*C7)$ | Chance of 3 Random Trials on all Character Units (1 in X) 11 C10/3 | Password Safety index (BIGVIP) 12 log(C11)/ log(2) | Number of Non Repeating Character Units in Password 13 | Number of possible Passwords with Non Repeating Characters 14 C6/C13 | Chance of 3 Random Trials on Non Repeating Characters (1 in X) 15 $C4\hat{}(C5*C13)/3$ | Password Safety Index (NRBIGVIP) 16 log(C15)/ log(2) | Number of possible VCSs 17 $(C8)P_{(C6)}$ |
|---|---|---|---|---|---|---|---|---|
| 11 | 3.09E+08 | 1.03E+08 | 27 | 2 | 40 | 1.03E+08 | 27 | VLN |
| 12 | 5.43E+12 | 1.81E+12 | 41 | 2 | 40 | 1.03E+08 | 27 | VLN |
| 13 | 9.54E+16 | 3.18E+16 | 55 | 3 | 26 | 1.81E+12 | 41 | VLN |
| 14 | 6.87E+22 | 2.29E+22 | 74 | 1 | 100 | 8.74E+10 | 36 | VLN |
| 15 | 1.80E+34 | 6.00E+33 | 112 | 2 | 50 | 2.29E+22 | 74 | VLN |
| 16 | 4.72E+45 | 1.57E'045 | 150 | 3 | 33 | 6.00E+33 | 112 | VLN |
| 17 | 1.24E+57 | 4.13E+56 | 188 | 4 | 25 | 1.57E+45 | 150 | VLN |
| 18 | 3.25E+68 | 1.08E+68 | 226 | 5 | 20 | 4.13E+56 | 188 | VLN |
| 19 | 2.38E+34 | 7.04E+33 | 113 | 2 | 75 | 2.76E+22 | 75 | VLN |
| 20 | 6.85E+45 | 2.28E+45 | 151 | 3 | 50 | 7.94E+33 | 113 | VLN |

TABLE V

MVCS 1

| | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 0 | 6C | FP | XK | CT | 8O | RW | P4 | 4T | MV | 6J | JO | K0 | 64 | 3H | CG | 88 | EL | MU | VF | JM |
| 1 | H6 | DQ | P3 | 9E | CW | N9 | 5C | 3D | 5A | M8 | KY | SZ | TS | 7N | 8Y | JS | R3 | 5Q | I9 | 8T |
| 2 | L6 | EA | HZ | RU | TT | 2W | 5W | 55 | KR | 0P | 34 | 4F | LR | 83 | KY | YY | QW | LQ | JZ | Y2 |
| 3 | Q9 | U7 | 1X | 32 | TA | SH | J0 | QU | KS | PD | BI | RJ | JO | C4 | JA | JE | GQ | 1V | M2 | PD |
| 4 | CH | Q7 | TN | 61 | 43 | SN | 1Y | 3C | X0 | LE | MT | F5 | QF | PS | 1O | CX | LF | L7 | 21 | XJ |
| 5 | EJ | E8 | IY | 5X | EM | 1M | CC | GG | PD | P6 | 3P | S8 | YM | QM | 59 | 0M | XB | 5X | Z9 | SS |
| 6 | JT | N1 | 4W | FA | 1W | ED | YE | 8A | PY | QP | 2W | QM | T4 | IE | 4U | IC | 37 | 5D | 2U | KD |
| 7 | FQ | WV | ZE | E2 | 2O | J3 | RH | 2D | CY | 7M | NG | UX | BQ | B2 | BI | C6 | LC | EO | KQ | RR |
| 8 | MI | DO | P4 | S1 | 7K | DZ | DD | 81 | HN | CU | II | M8 | E1 | V9 | A1 | L8 | V1 | VB | 58 | 44 |
| 9 | J0 | 87 | GZ | TT | 68 | JK | 9Y | L3 | OC | O5 | 4C | 4M | PY | LN | 76 | 4R | EP | G1 | IK | OQ |
| 10 | TS | XM | 1J | EG | O8 | WL | EU | SL | FE | SV | MQ | FU | BE | BU | 1T | A6 | XP | RQ | AH | NW |
| 11 | R6 | A8 | FF | R5 | 4J | MD | BH | 6D | L9 | 5W | MP | GW | 73 | 3A | 94 | 6I | FI | G0 | AY | X6 |
| 12 | MB | HU | A3 | 86 | ET | JL | OV | PN | 3I | X2 | C8 | Q8 | 59 | WH | H2 | PJ | KZ | L6 | 9Y | LL |
| 13 | YC | XI | TY | 2H | L5 | NC | XO | EW | AZ | Z2 | OU | Y9 | G1 | L6 | 2Q | 3G | O6 | F6 | UL | 00 |
| 14 | XY | 5W | V5 | TO | HJ | N7 | ML | 7F | 7Y | WD | N5 | IJ | RA | 8M | XJ | JC | 8F | UP | 3C | 1A |

36 Basic Characters (A to Z and 0 to 9);
2 Basic Characters per Character Unit; and
300 total Character Units.
Character Unit serial numbers (SNCU) should be reckoned a row number × 20 + column number. Column numbers are indicated in the top row and row numbers are indicated in the leftmost column.

The invention claimed is:

1. A computer implemented method of authenticated dialogue initiation between a USER and a second party using variable passwords, the method comprising:
   making a variable character set publicly available and storing the variable character set in a memory of at least one device, the variable character set is comprised of a plurality of character units and character unit serial numbers, wherein each of the plurality of character units is associated with a unique character unit serial number;
   the USER storing the variable character set in a memory of at least one device;
   establishing a connection between the USER and the second party, wherein the USER issues a CALL to an IP address of the second party, the CALL is comprised of two or more randomly selected character unit serial numbers selected from the variable character set; upon accepting the connection request and in response to the CALL, the second party transmits a password comprised of the character units associated with the character unit serial numbers of the CALL from the IP address; in response to receiving the password, the USER validates the password entered by the second party by comparing the character units thereof against the character units associated with the character unit serial numbers used for the CALL, and verifies that the IP address of the party transmitting the password is the same IP address to which the CALL was issued; and
   authenticating the second party upon receiving a valid password from the IP address to which the CALL was issued, wherein the second party now has access to the USER's computer system.

2. The method of claim 1, wherein the plurality of character units of the variable character set are comprised of one or more basic characters, each basic character is a letter, a symbol, or a number.

3. The method of claim 2, further comprising the step of applying font property variations to one or more of the basic characters of the character units of the variable character set, wherein the font property variations applied to the basic characters include at least one member of a group consisting of font type change, bold, underline, color change, font size, shading, and italics.

4. The method of claim 1, wherein the USER can regulate the second parties' access to the USER's computer system by only authenticating the IP address of the second party.

5. The method of claim 1, wherein the second party is unknown to the USER.

6. The method of claim 1, wherein the variable character set is stored in a memory of a publicly accessible server that is connected to the internet, the publicly accessible server can be accessed by the USER and the second party.

\* \* \* \* \*

UNITED STATES PATENT AND TRADEMARK OFFICE
CERTIFICATE OF CORRECTION

PATENT NO. : 10,182,049 B2
APPLICATION NO. : 15/713621
DATED : January 15, 2019
INVENTOR(S) : Abdul Rahman Syed Ebrahim Abdul Hameed Khan Page 1 of 1

It is certified that error appears in the above-identified patent and that said Letters Patent is hereby corrected as shown below:

On the Title Page

Item (72), Inventor's name should read:
Abdul Rahman Syed Ibrahim Abdul Hameed Khan, Chennai (IN)

Signed and Sealed this
Twenty-ninth Day of October, 2019

Andrei Iancu
*Director of the United States Patent and Trademark Office*